(12) United States Patent
Koya et al.

(10) Patent No.: US 12,043,220 B2
(45) Date of Patent: Jul. 23, 2024

(54) WIPER BLADE CONNECTOR

(71) Applicants: CANADIAN TIRE CORPORATION LIMITED, Toronto (CA); CAP CORPORATION, Gyeongsangbuk-do (KR)

(72) Inventors: Abdul Haleem Ahamed Koya, Oakville (CA); David Green, Toronto (CA); John Paul Schmider, Scarborough (CA); Edmond Mok, Scarborough (CA); Anthony Wolf, Toronto (CA); Yu Dong Min, Gyeongbuk (KR)

(73) Assignee: CANADIAN TIRE CORPORATION, LIMITED et al., Toronto (CA)

( * ) Notice: Subject to any disclaimer, the term of this patent is extended or adjusted under 35 U.S.C. 154(b) by 124 days.

(21) Appl. No.: 17/735,688

(22) Filed: May 3, 2022

(65) Prior Publication Data
US 2022/0348167 A1 Nov. 3, 2022

Related U.S. Application Data

(60) Provisional application No. 63/183,212, filed on May 3, 2021.

(51) Int. Cl.
*B60S 1/40* (2006.01)
*B60S 1/38* (2006.01)

(52) U.S. Cl.
CPC ........... *B60S 1/4009* (2013.01); *B60S 1/3849* (2013.01); *B60S 1/3851* (2013.01); *B60S 1/3853* (2013.01);
(Continued)

(58) Field of Classification Search
CPC .... B60S 1/3858; B60S 1/3851; B60S 1/3849; B60S 1/3848; B60S 1/3853; B60S 1/3865; B60S 1/3867; B60S 1/387; B60S 1/4009
(Continued)

(56) References Cited

U.S. PATENT DOCUMENTS

| 7,950,101 | B2 | 5/2011 | Kim | |
| 8,381,349 | B2 * | 2/2013 | Ku | B60S 1/3853 15/250.43 |

(Continued)

FOREIGN PATENT DOCUMENTS

| CA | 2590443 | 1/2012 |
| CA | 2891269 | 5/2014 |

(Continued)

*Primary Examiner* — Gary K. Graham
(74) *Attorney, Agent, or Firm* — NORTON ROSE FULBRIGHT CANADA LLP

(57) ABSTRACT

A wiper blade connector for connecting a wiper blade to a wiper arm, has: an adaptor secured to an end of the wiper arm; a base secured to the wiper blade; a locking member operatively mounted to one of the adaptor and the base and movable relative to the one of the adaptor and the base between a locked position and an unlocked position, the adaptor secured to the base via the locking member in the locked position, the adaptor detachable from the base in the unlocked position; a user-engageable member operatively connected to the locking member, the user-engageable member movable to move the locking member from the locked position to the unlocked position to detach the adaptor from the base.

15 Claims, 21 Drawing Sheets

(52) U.S. Cl.
CPC ........... *B60S 1/3858* (2013.01); *B60S 1/3867* (2013.01); *B60S 2001/4022* (2013.01)

(58) Field of Classification Search
USPC .......................... 15/250.32, 250.44, 250.43
See application file for complete search history.

(56) References Cited

U.S. PATENT DOCUMENTS

| | | | |
|---|---|---|---|
| 8,505,151 | B2 | 8/2013 | Depondt et al. |
| 8,615,841 | B2 | 12/2013 | Kim et al. |
| 8,938,847 | B2 | 1/2015 | Avasiloaie et al. |
| 9,003,596 | B2 | 4/2015 | Avasiloaie et al. |
| 9,174,611 | B2 | 11/2015 | Tolentino et al. |
| 9,221,429 | B2 | 12/2015 | Avasiloaie et al. |
| 9,381,893 | B2 | 7/2016 | Tolentino et al. |
| 9,434,354 | B2 | 9/2016 | Avasiloaie et al. |
| 9,499,131 | B2 | 11/2016 | Obert et al. |
| 9,637,090 | B2 | 5/2017 | Baumert et al. |
| 9,771,052 | B2* | 9/2017 | Avasiloaie ............ B60S 1/4003 |
| 10,457,252 | B2 | 10/2019 | Tolentino et al. |
| 2009/0199357 | A1* | 8/2009 | Thienard ............... B60S 1/4067 15/250.32 |
| 2019/0217821 | A1 | 7/2019 | Leardi |
| 2019/0034475 | A1 | 11/2019 | Parikh et al. |

FOREIGN PATENT DOCUMENTS

| | | |
|---|---|---|
| CA | 2809947 | 11/2014 |
| CA | 2810705 | 12/2015 |
| CA | 2810711 | 12/2015 |
| CA | 2880210 | 5/2016 |
| CA | 288021 | 10/2016 |
| CA | 2879480 | 1/2017 |
| CA | 2898928 | 1/2017 |
| CA | 2843527 | 11/2018 |
| CA | 2843637 | 12/2018 |

* cited by examiner

FIG_3

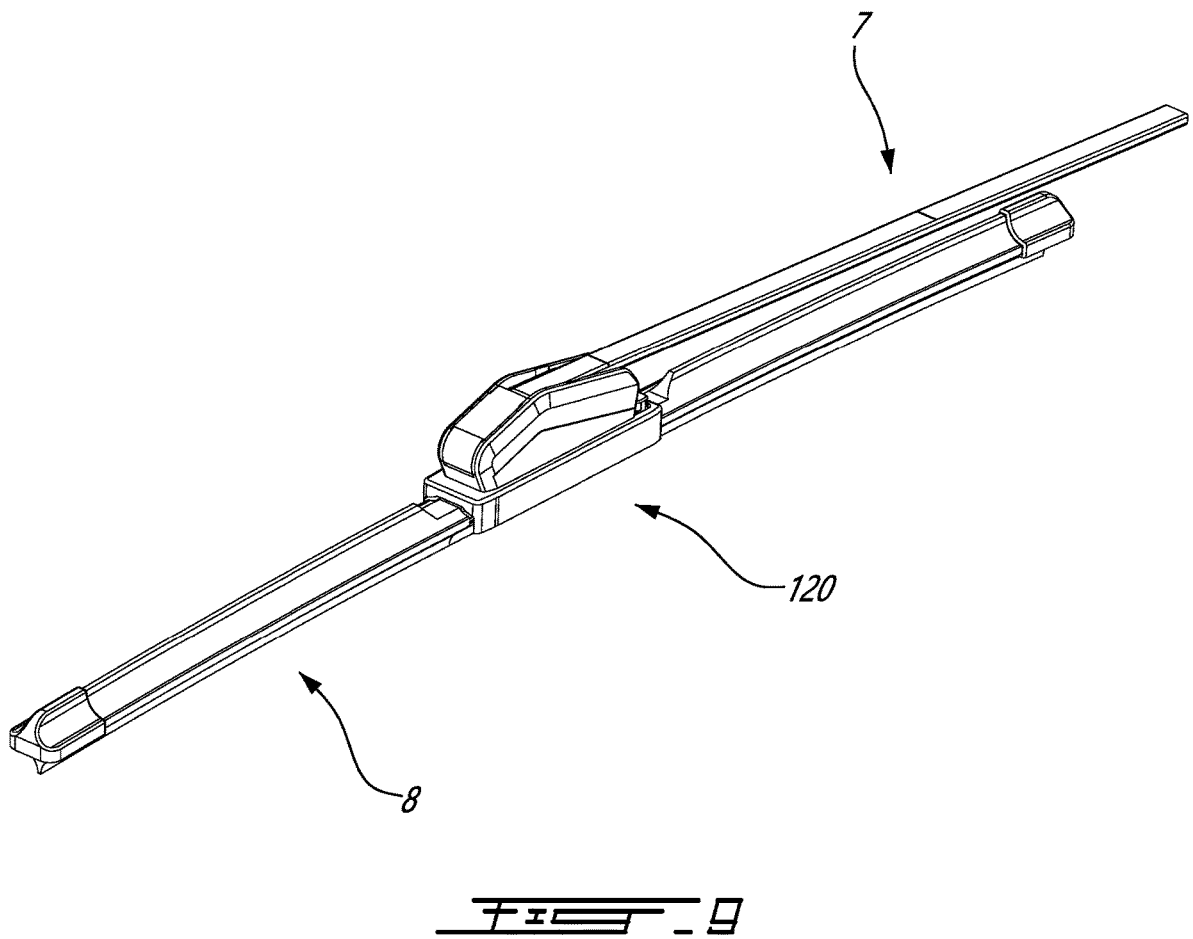

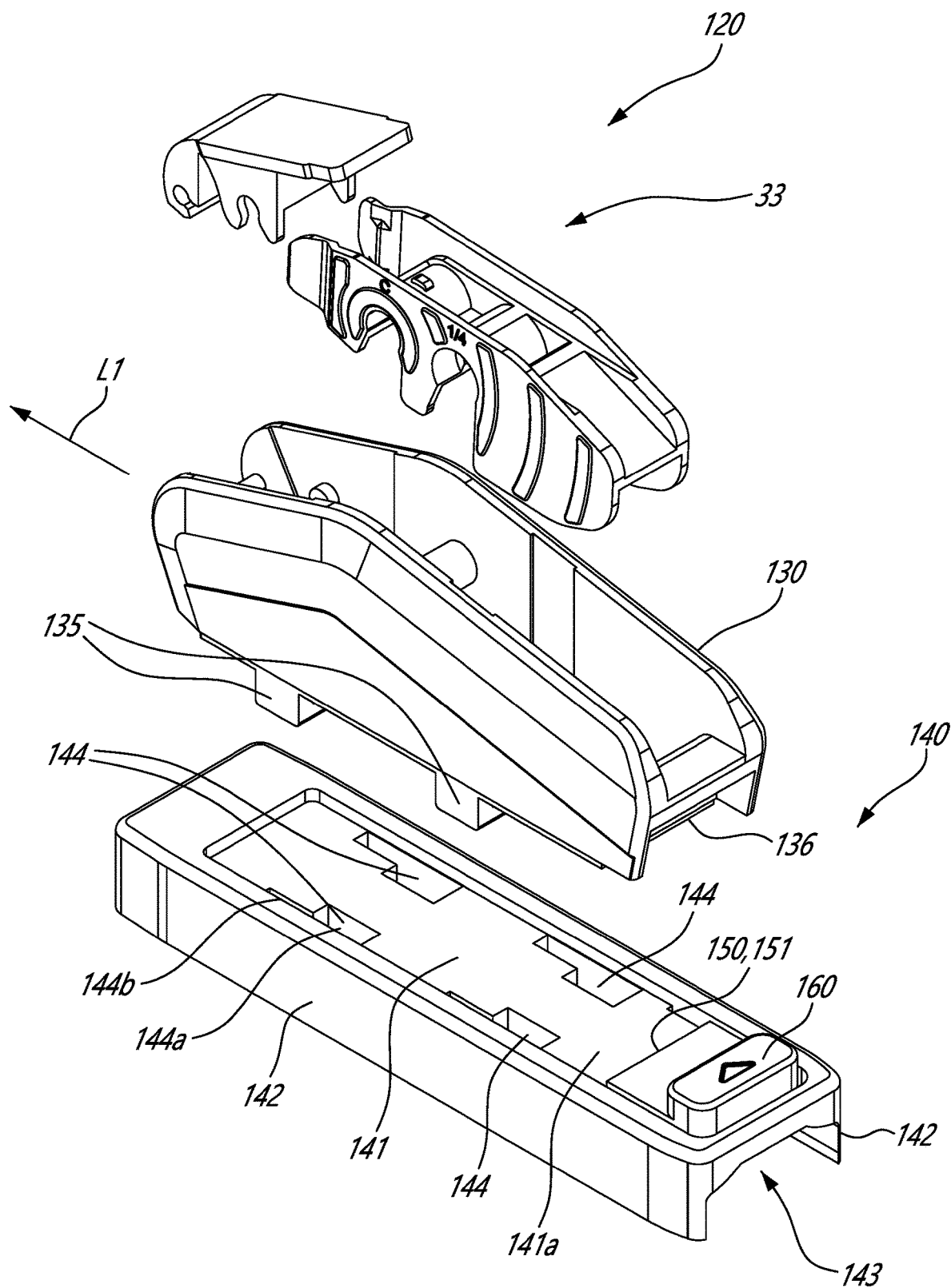

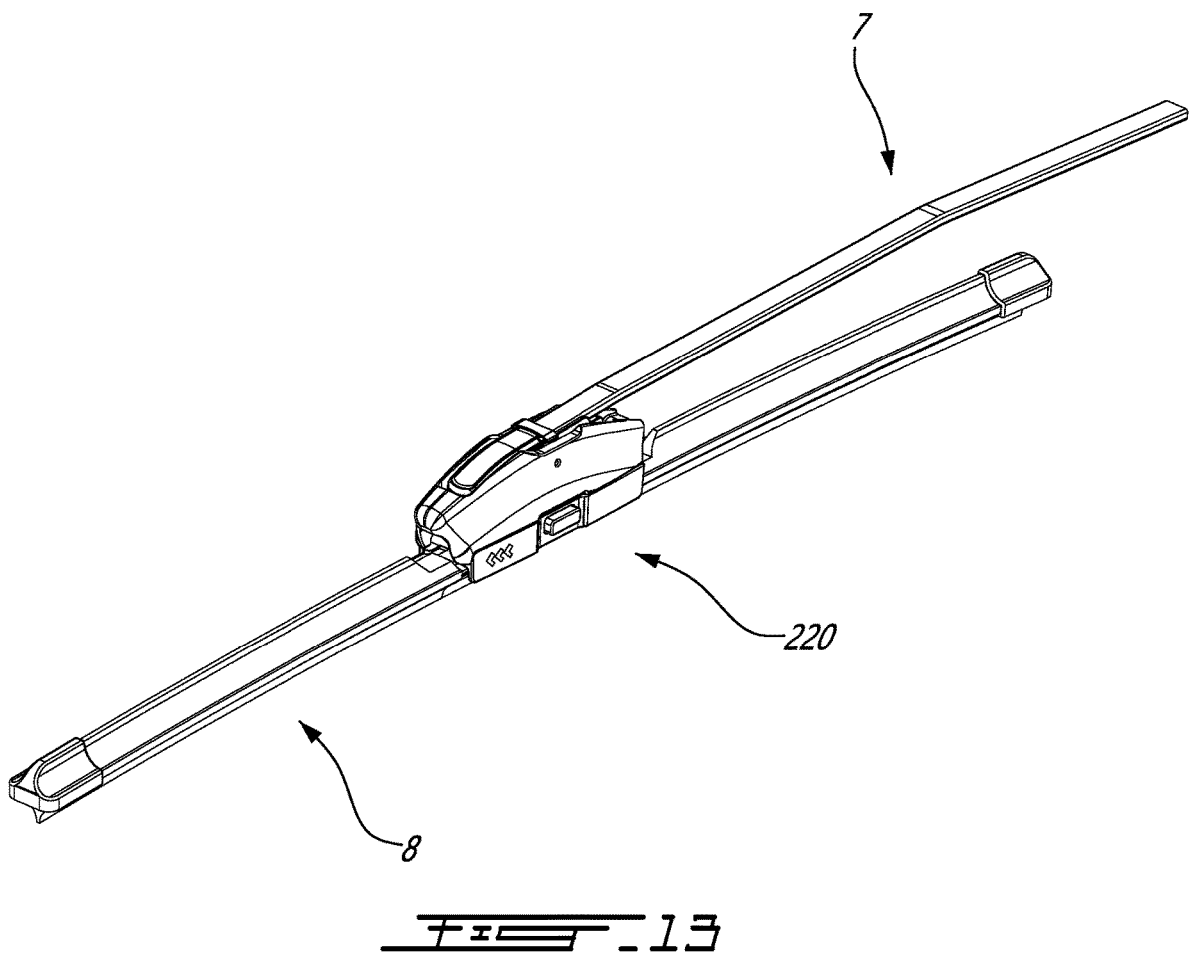

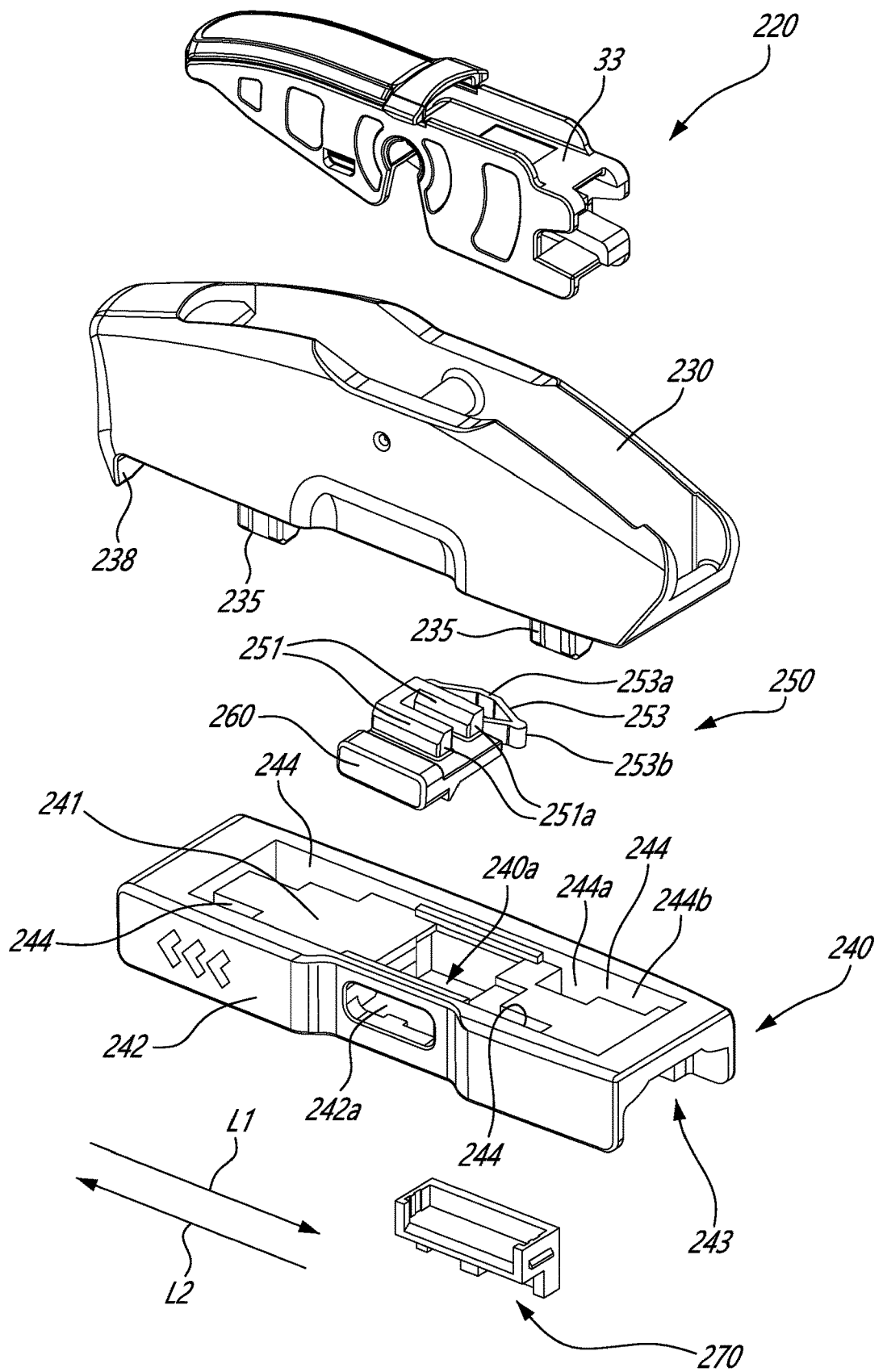

WIPER BLADE CONNECTOR

CROSS-REFERENCE TO RELATED APPLICATIONS

This application claims priority from U.S. patent application Ser. No. 63/183,212 filed on May 3, 2021. Its content is incorporated herewith in its entirety.

TECHNICAL FIELD

This disclosure generally relates to the field of the automotive industry and, more particularly, relates to devices used for connecting a wiper blade to a movable arm of a wiper system of a vehicle.

BACKGROUND OF THE ART

A wiper system for a vehicle typically uses pivotable arms and wiper blades secured to distal ends of said arms. With time, a rubber or elastomeric part of the wiper blades becomes worn out and needs to be changed. This process may be cumbersome because of the many possible designs of arms of the different manufacturers. Moreover, there may be some challenges in the removal of the worn out blade since most wiper systems are not designed to be easily disassembled. Hence, a user not only has to select the appropriate wiper blade length for his or her car, he or she must also ensure that the wiper blades are compatible with the arms of the wiper system of the vehicle. Improvements are therefore sought.

SUMMARY

In accordance with one aspect, there is provided a wiper blade connector for connecting a wiper blade to an arm of a wiper system of a vehicle, comprising an arm adaptor removably securable to the arm of the wiper system, a base securable to a wiper blade, the base being removably securable to the arm adaptor, a locking member between the arm adaptor and the base, the locking member having a locked position in which the arm adaptor is secured to the base by the locking member, the locking member having an unlocked position in which the arm adaptor is detachable from the base for replacement of the wiper blade, and a user-engageable member operatively connected to the locking member, the user-engageable member movable in a first direction to move the locking member from the locked position to the unlocked position to detach the arm adaptor from the base.

In another aspect, there is provided a wiper blade connector for connecting a wiper blade to a wiper arm, comprising: an adaptor secured to an end of the wiper arm; a base secured to the wiper blade; a locking member operatively mounted to one of the adaptor and the base and movable relative to the one of the adaptor and the base between a locked position and an unlocked position, the adaptor secured to the base via the locking member in the locked position, the adaptor detachable from the base in the unlocked position; a user-engageable member operatively connected to the locking member, the user-engageable member movable to move the locking member from the locked position to the unlocked position to detach the adaptor from the base.

The wiper blade connector as described above may include any of the following features, in any combinations.

In some embodiments, the locking member and the one of the adaptor and the base are separate components.

In some embodiments, the one of the adaptor and the base is the base.

In some embodiments, the base has a base plate and a cover plate secured to the base plate, a space defined between the base plate and the cover plate, the locking member received within the space.

In some embodiments, the locking member is movable within the space in a first direction being parallel to the base plate to unlock the adaptor from the base.

In some embodiments, the locking member includes an arm defining a cleat, the adaptor having a housing defining a protrusion, the cleat engaged to the protrusion in the locked position of the locking member, the cleat and the protrusion defining abutment faces that, when abutting one another, prevent movements of the base relative to the adaptor along a second direction being perpendicular to the base.

In some embodiments, the adaptor is engageable to the base along the second direction, the arm being biased in a first direction perpendicular to the second direction by a biasing member, the cleat defining a chamfered face, a movement of the adaptor relative to the base along the second direction causing abutment of the protrusion against the chamfered face of the cleat to move the cleat in the first direction until the cleat snaps in engagement with the protrusion thereby causing the abutment faces to abut one another.

In some embodiments, the arm includes two arms, the protrusion includes four protrusions, and the cleat includes four cleats, the four cleats located at opposed distal ends of the two arms.

In some embodiments, a biasing member is between the two arms and engaged to the two arms and operable to exert a force to bias the two arms away from one another.

In some embodiments, the biasing member and the two arms are parts of a single monolithic body.

In some embodiments, the user-engageable member includes two buttons each defined by a respective one of the two arms.

In some embodiments, a movement of the adaptor relative to the base along the second direction causes abutment of the protrusions against chamfered faces of the cleats thereby moving the two buttons toward one another in a first direction perpendicular to the second direction until the cleats snap in engagement with the protrusions thereby causing the abutment faces of the protrusions and the cleats to abut one another.

In some embodiments, the base includes a top wall defining at least one aperture having a first portion and a second portion of a lesser width than that of the first portion, the adaptor having a housing defining at least one L-shaped protrusion protruding transversally from a bottom wall of the housing, the at least one L-shaped protrusion having a web and a tab extending transversally to the web, the tab receivable within the first portion of the at least one aperture.

In some embodiments, the adaptor is movable relative to the base in a first direction being perpendicular to the top wall until the tab is received through the first portion of the at least one aperture, and movable in a second direction transverse to the first direction until the web is received within the second portion of the at least one aperture and until the tab is underneath the top wall thereby preventing movements of adaptor relative to the base in the first direction.

In some embodiments, the locking member is a shoulder defined by an extension of the top wall, the extension being cantilevered and flexible, the shoulder in abutment against the housing of the adaptor in the locked position to prevent movements of the adaptor relative to the base in the second direction and to maintain the tab underneath the top wall.

In some embodiments, the user-engageable member is a button defined at a distal end of the extension of the top wall, the button movable downwardly to disengage the shoulder from the housing to allow a movement of the adaptor relative to the base in the second direction to disengage the tab from the top wall.

In some embodiments, the locking member is received within a cavity of the base, the locking member having at least one projection in abutment against a stopper of the housing of the adaptor to prevent movement of the adaptor relative to the housing in the second direction.

In some embodiments, the locking member is biased in the locked position by a biasing member engaged to the base.

In some embodiments, the locking member and the biasing member are parts of a single monolithic body.

In some embodiments, the user-engageable member is a button defined by the locking member, the button protruding through an opening defined through a side wall of the base, the button movable in a third direction perpendicular to both of the first direction and the second direction.

Many further features and combinations thereof concerning the present improvements will appear to those skilled in the art following a reading of the instant disclosure.

DESCRIPTION OF THE DRAWINGS

FIG. 9 is a three dimensional view of an exemplary wiper blade assembly in accordance with another embodiment;

FIG. 10 is a three dimensional view illustrating a wiper blade connector in accordance with another embodiment and illustrated in a disengaged position;

FIG. 13 is a three view of an exemplary wiper blade assembly in accordance with another embodiment;

FIG. 14 is a three dimensional exploded view illustrating a wiper blade connector in accordance with another embodiment;

DETAILED DESCRIPTION

Figure 1:
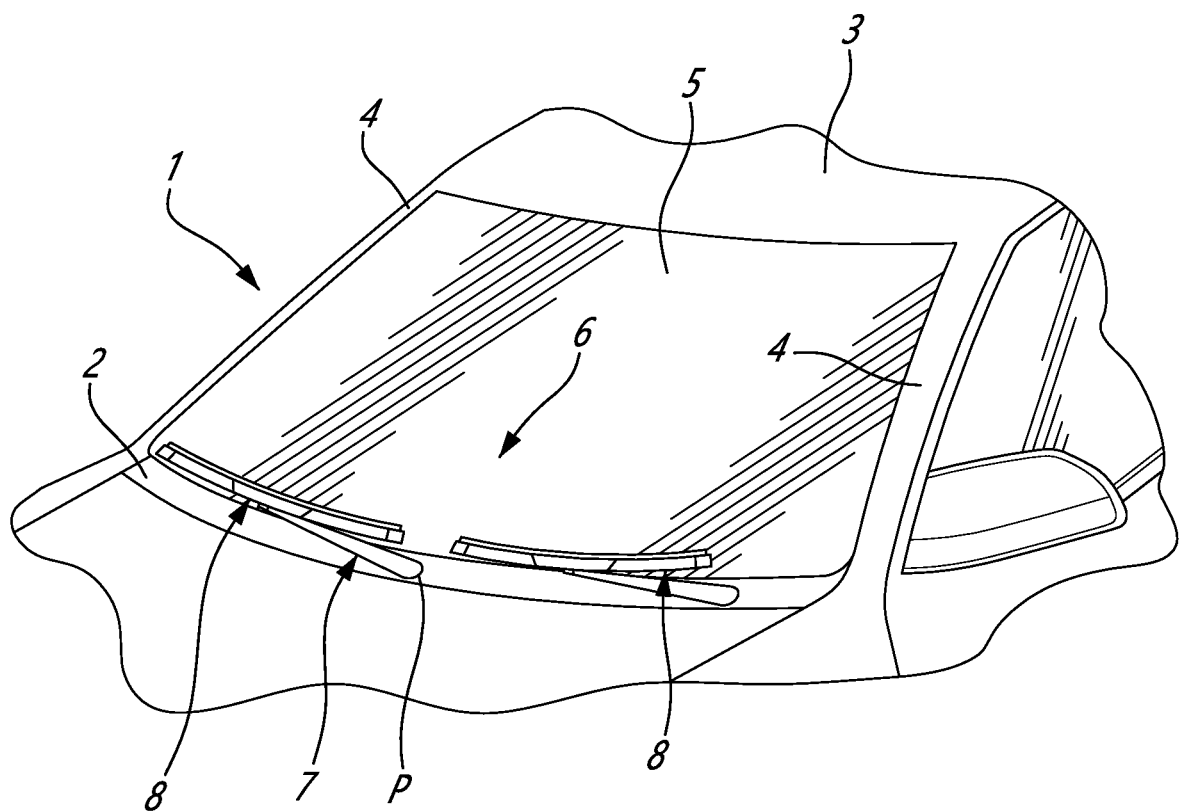
FIG. 1 is a schematic three dimensional front view of a front of an exemplary vehicle in accordance with one embodiment.

FIG. 1 shows a vehicle 1 having a hood 2, a roof 3, and side beams or A-pillars 4. An opening is defined between the side beams 3, the hood 2, and the roof 3 to receive a windshield 5. For removing snow or rain from the windshield 5, the vehicle 1 is equipped with a wiper system 6 having two arms 7, although more or less than two arms 7 is contemplated. Each of the two arms 7 is coupled at its distal end with a wiper blade 8. The arms 7 are pivotable about pivot points P such that the wiper blades 8 move between a stored position shown in FIG. 1 to a deployed position in which the wiper blades 8 are substantially transverse to their position in the stored position. Although reference is made herein to a vehicle 1 fitted with a wiper system 6 on the vehicle's front window (i.e. windshield 5), it should be understood that the wiper may also be provided on a rear window (not shown) of the vehicle 1. The wiper blade assembly described herein may therefore be a front-window wiper blade assembly or a rear-window wiper blade assembly.

Figure 2:
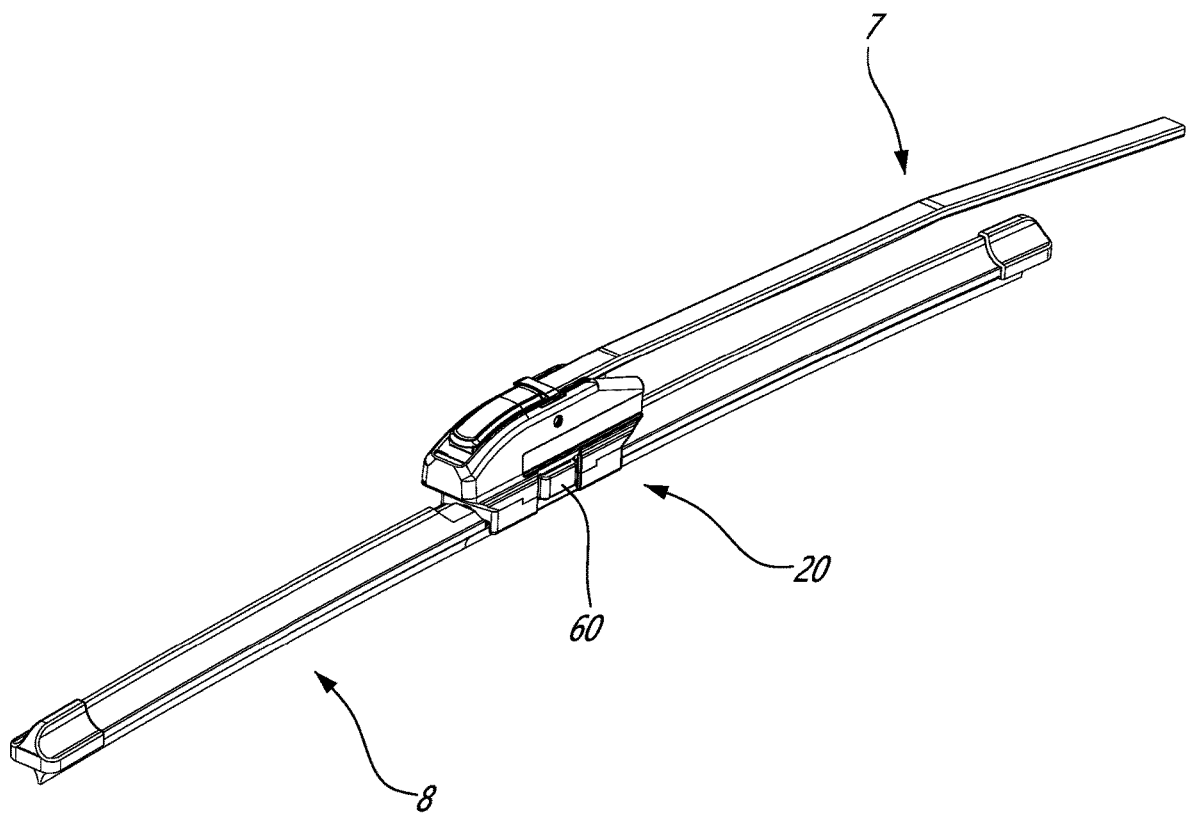
FIG. 2 is a three dimensional view of an exemplary wiper blade assembly in accordance with one embodiment that may be used with the vehicle of FIG. 1.

Referring now to FIG. 2, an exemplary wiper blade assembly is shown and includes the wiper arm 7, the wiper blade 8, and a wiper blade connector 20 that is used for connecting the wiper arm 7 to the wiper blade 8. As will be explained below, the wiper blade connector 20 acts as an interface between an end of the wiper arm 7, which may present a plethora of possible connectors, such as a J-hook, and the wiper blade 8. Possible effective ends of the wiper arm 7 are presented below with reference to FIGS. 19A to 23D.

Figure 3:
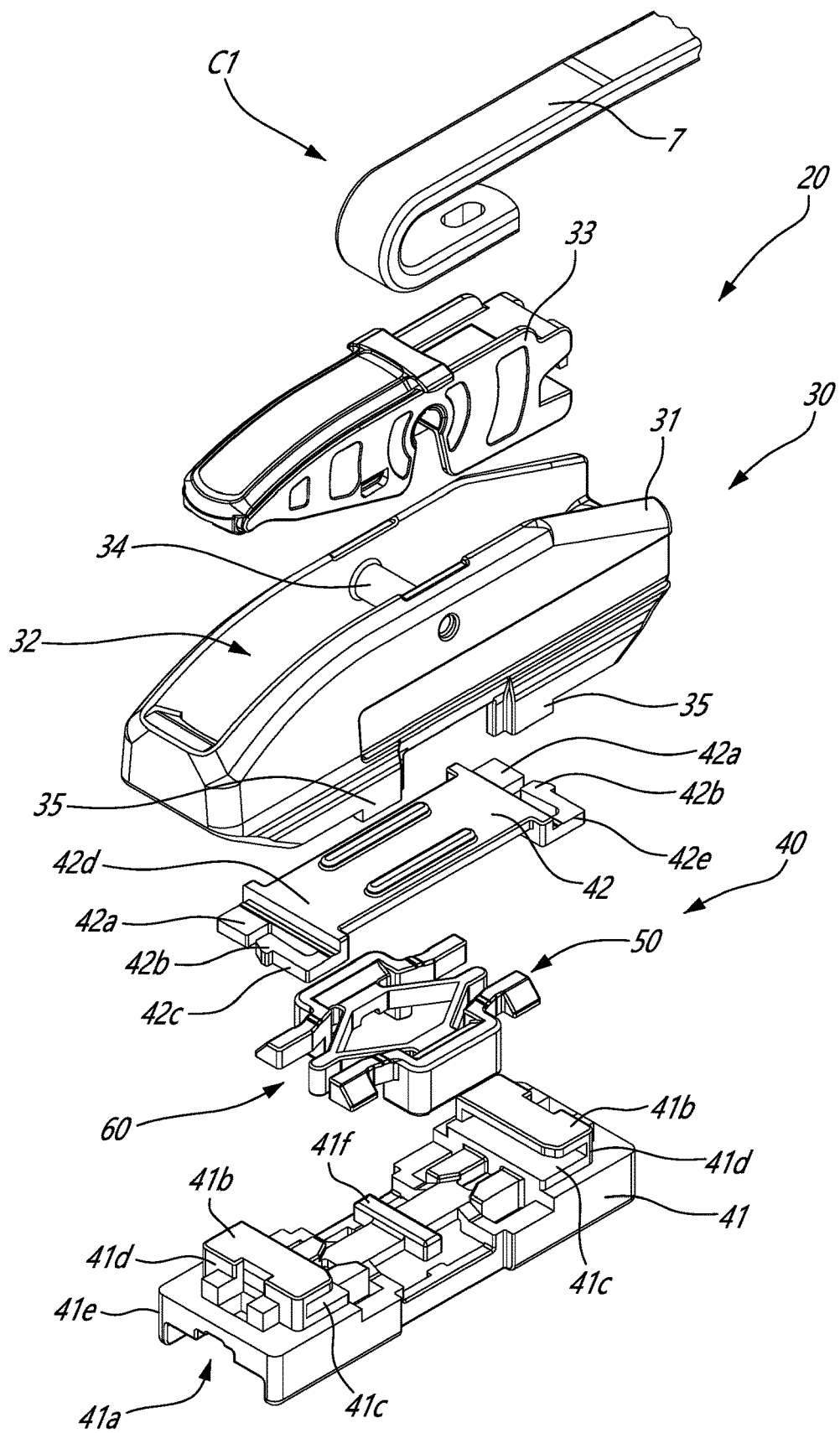
FIG. 3 is a three dimensional exploded view illustrating a wiper blade connector in accordance with one embodiment.

Referring now to FIGS. 2-3, the wiper blade connector, referred simply as "connector 20" below, is described in more detail. The connector 20 includes an arm adaptor 30, or simply "adaptor" below that may be secured to an end of the wiper arm 7, a base 40 that may be secured to the wiper blade 8, a locking member 50, and a user-engageable member 60. The locking member 50 is located between the arm adaptor 30 and the base 40. The locking member 50 is herein shown as being operatively mounted to the base 40, but may alternatively be mounted to the adaptor 30. The locking member 50 has a locked position in which the arm adaptor 30 is secured to the base 40 by the locking member 50. The locking member 50 has an unlocked position in which the arm adaptor 30 is detachable from the base 40 for replacement of the wiper blade 8. The locking member 50 is movable between the locked and unlocked positions by a user. The user engageable member 60 is operatively connected to the locking member 50 and is movable in a given direction to move the locking member 50 from the locked position to the unlocked position to permit detachment of the arm adaptor 30 from the base 40. In the present embodiment, the locking member 50 and the base 40 are separate components.

When it is time to change the wiper blade 8 of the vehicle 10, the user may select an arm adaptor 30 that is compatible to the wiper arm 7 of his or her vehicle 1. The user then selects appropriate wiper blades 8 that are compatible with the arm adaptor 30. The user installs the arm adaptor 30 to the wiper arm 7 of the vehicle 1. The arm adaptor 30 may be permanently attached to the wiper arm 7. That is, the arm adaptor 30, although it may be removed from the wiper arm 7, need not be removed from the wiper arm 7 for changing the wiper blade 8. For a subsequent replacement of the wiper blade 8, the user may buy an appropriate wiper blade 8 that is compatible with the arm adaptor 30. As will be described below, the user-engageable member 60 is engaged by the user to separate the existing wiper blade 8 from the wiper arm 7 and its connected arm adaptor 30 and may install the new wiper blade 8.

Figure 4:
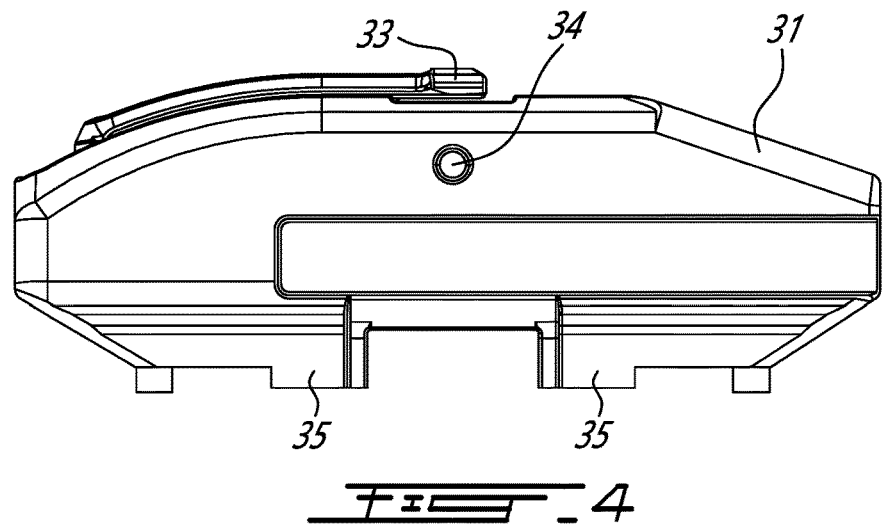
FIG. 4 is a side view of an arm adaptor of the wiper blade connector of FIG. 3.

Referring to FIGS. 3-4, the arm adaptor 30 is described in more detail. The arm adaptor 30 includes a housing 31 having an inner cavity 32 sized for receiving a j-hook adaptor 33 that is removably engageable to the j-hook C1 of the wiper arm 7. As shown in FIG. 3, the housing 31 has a shaft 34 extending across the inner cavity 32. The j-hook C1 may therefore partially wrap around the shaft 34 for connecting the wiper arm 7 to the housing 31. The j-hook adaptor 33 is used as an interface between the j-hook connector C1 and the shaft 34 of the housing 31 and may ensure a secure connection therebetween.

The housing 31 defines protrusions 35, four protrusions 35 in the present embodiment although more or less than four protrusions 35 may be present. The protrusions 35 may be disposed on opposite sides of the housing 31 such that two protrusions 35 are located on a first side of the inner cavity 32 of the housing 31 and the remaining two protrusions 35 are located on a second opposite side of the inner cavity 32. The protrusions 35 may be L-shaped and define tabs at their distal ends; the tabs of the protrusions 35 oriented inwardly toward the inner cavity 32 of the housing 31. It will be understood that the tabs may alternatively be oriented outwardly away from the inner cavity 35. In other words, the tabs of the protrusions 35 are oriented toward a center of the connector 20, but may instead be oriented away from the center of the connector 20.

Figure 5:
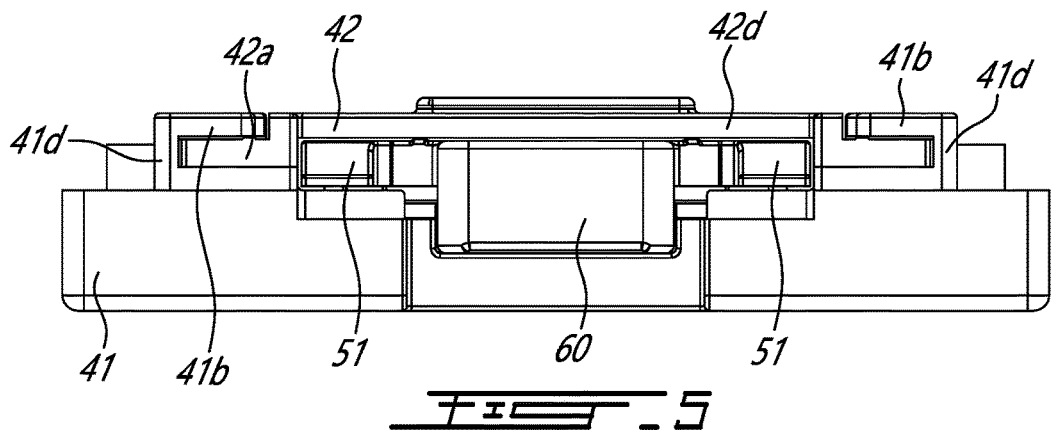
FIG. 5 is a side view of a base of the wiper blade connector of FIG. 3.

Referring to FIGS. 3 and 5, the base 40 includes a first plate also referred to as a base plate 41 and a second plate also referred to as a cover plate 42. The cover plate 42 is removably securable to the base plate 41. The base 40 may be permanently attached to the wiper blade 8 such that the wiper blade 8 may be sold with this base 40. The cover plate 42 and the base plate 41 defines a space therebetween for receiving the locking member 50. The locking member 50 is movable within the space in a direction that is parallel to the base 40 to unlock the adaptor 30 from the base 40. More detail about this are presented below.

The base plate 41 defines a recess 41a on its underside for accepting the wiper blade 7. In other words, the base 40 may be considered as a straddle connectable to the wiper blade 7. The base plate 41 defines two flaps 41b each spaced apart from a remainder of the base plate 41 to define two slots 41c sized for receiving each a respective end portion 42a of the cover plate 42. The two slots 41c may be closed at one end such that the cover plate 42 may be inserted into the two slots 41c solely via a single side of the base plate 41. The two flaps 41b are connected to a remainder of the base plate 41 via two webs 41d that extends generally transversally to the remainder of the base plate 41. The two flaps 41b may be transverse to the two webs 41d. As shown in FIG. 3, the two webs 41d define each an aperture 41e. The base plate 41 further defines a guiding member 41f that may be substantially parallel to a direction of insertion of the cover plate 42 into the two slots 41c.

Referring to FIG. 3, the cover plate 42 includes two locking tabs 42b each removably receivable within a respective one of the two apertures 41e defined by the webs 41d of the base plate 41. Those two locking tabs 42b are located at distal ends of plate arms 42c that are movable relative to a central portion 42d of the cover plate 42 via flexible members or living hinges 42e. In the present disclosure, the expression "living hinge" refers to a flexible hinge made from the same material as the two pieces it connects and it can deform elastically to permit relative rotation of the two pieces connected by the living hinge. The cover plate 42 may be secured to the base plate 41 by sliding the end portions 42a into the respective slots 41c of the base plate 41 thereby pushing the locking tabs 42b toward one another and toward the central portion 42d of the cover plate 42 until the locking tabs 42b become in register with the apertures 41e defined by the webs 41d. At which point, the locking tabs 42b snap inside these apertures 41e such that the cover plate 42 is secured to the base plate 41 by the locking tabs 42b engaging the apertures 41e of the base plate 41. The locking tabs 42b may have a beveled or chamfered face to help in pushing the locking tabs 42b toward the central portion 42d while the cover plate 42 is being inserted in the slots 41c of the base plate 41. It will be appreciated that, in some embodiments, the cover plate 42 may be omitted. In some other embodiments, the cover plate 42 may be secured to the base plate 41 with any suitable means, such as keyway, dog and slot, snap fit, and so on without departing from the scope of the present disclosure.

Figure 6:
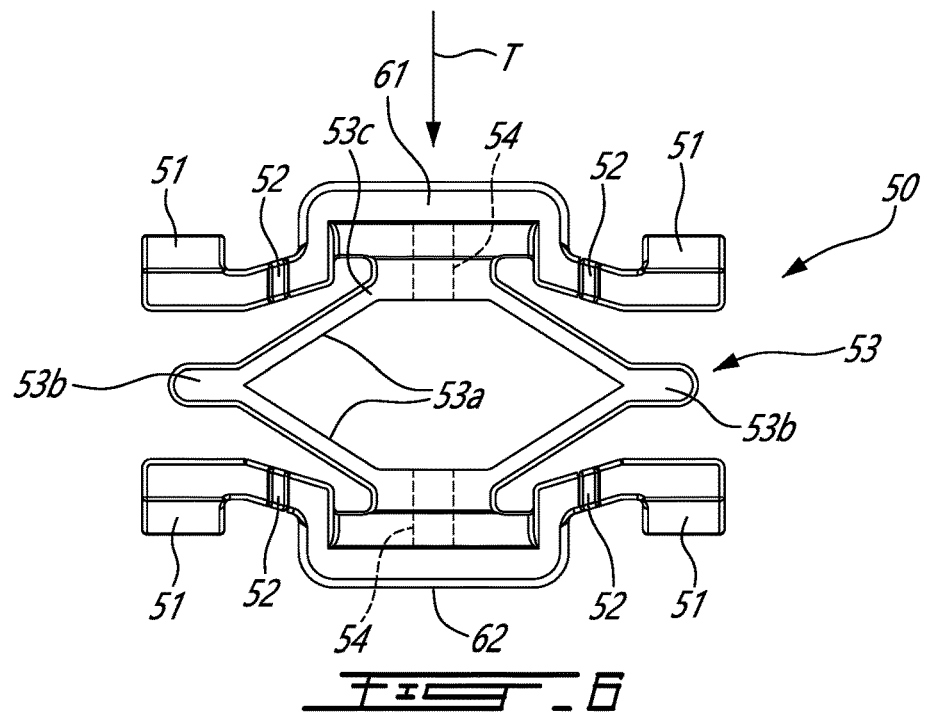
FIG. 6 is a top view of a locking member of the wiper blade connector of FIG. 3.

Referring more particularly to FIG. 6, the locking member 50 is described in more detail. The locking member 50 includes cleats 51, four cleats 51 in the depicted embodiment, but more or less than four cleats 51 may be used in an alternate embodiment. The cleats 51 are located at distal ends of four arms 52, although more or less than four arms 52 may be used. The cleats 51 may have beveled or chamfered face facing upwardly away from the wiper blade 8 to ease the locking of the arm adaptor 30 to the base 40. Two of the four arms 52 protrude from a first button 61 of the user-engageable member 60. The remaining two of the four arms 52 protrude from a second button 62 of the user-engageable member 60. Hence, each of the first and second buttons 61, 62 is secured to two of the four arms 52; the two of the four arms 52 protruding away from one another. In the embodiment shown, the user-engageable member 60 and the locking member 50 are parts of a single monolithic body. The locking member 50 defines channels 54 sized for receiving the guiding member 41f of the base plate 41. A cooperation of the channels 54 and the guiding member 41f guides a movement of the first and second buttons 61, 62 in a transverse direction T when the locking member 50 is located between the base plate 41 and the cover plate 42.

The first button 61 is attached to the second button 62 via a biasing member 53. In the embodiment shown, the biasing member 53 includes two pairs of connecting legs 53a. Each pair of the connecting legs 53a has a spring that is elastically deformable. Stated differently, the legs 53a may form a spring. The legs 53a of each pair are connected to one another via a first connection 53b. The first connection 53b may be considered a living hinge. Each of the connecting legs 53a is secured to either the first button 61 or the second button 62 via a second connection 53c. The second connection 53c may also act as living hinge. Therefore, the first button 61 may be pushed toward the second button 62 by deformation of the connections 53b, 53c thereby moving the two cleats 51 secured to the first button 61 toward the other two cleats 51 secured to the second button 62 along the direction parallel to the base 40. It will be appreciated that the shape of the biasing member 53 is exemplary and that any suitable member allowing a resilient movement of the first button 61 relative to the second button 62 is contemplated. The biasing member 53 may alternatively be a spring or any other suitable biasing member able to resiliently deform and revert back to a baseline position and operable to bias the buttons away from one another.

Figure 7:
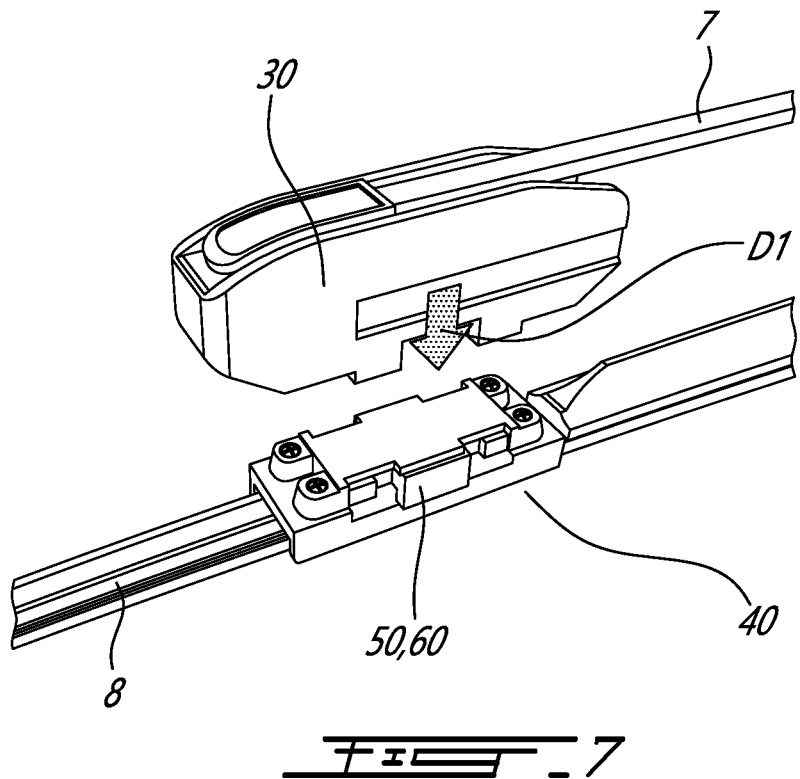
FIG. 7 is a three dimensional view of the wiper blade connector of FIG. 3 shown in a disengaged position.
Figure 8:
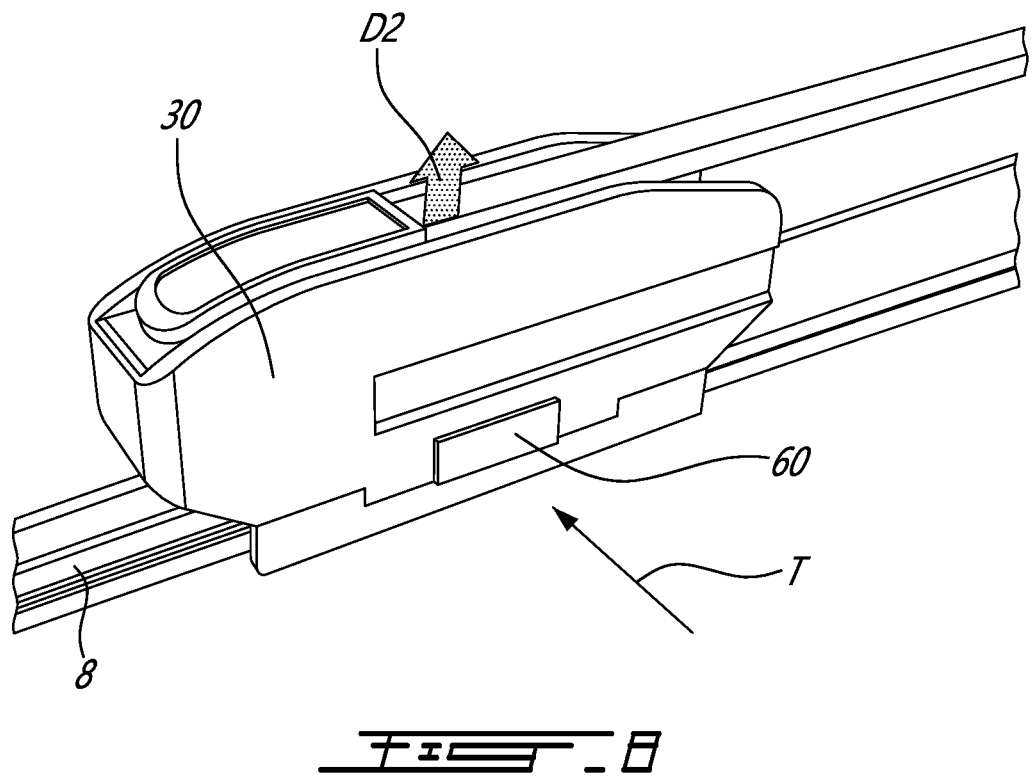
FIG. 8 is a three dimensional view of the wiper blade connector of FIG. 3 shown in an engaged position.

Referring now to FIGS. 7-8 with continued reference to FIGS. 3-6, to install the wiper blade 8 to the wiper arm 7, the arm adaptor 30 is moved relative to the base 40 along a first direction D1, which is substantially normal to the base 40 and perpendicular to the direction of movement of the locking member 50 within the space of the base 40. At which points, the cleats 51 abut the protrusions 35 of the arm adaptor 30. Further movements of the base 40 relative to the arm adaptor 30 along the first direction D1 pushes the cleats 51 toward one another by deforming the biasing member 53. The beveled face of the cleats 51 may help this movement of the cleats 51. At some point, the cleats 51 become past the protrusions 35 and snap underneath the protrusions 35 thereby locking the housing 31 to the base 40 via the cooperation of the protrusions 35 in abutment against the cleats 51. In the locked position, the cleats 51 are therefore located between the protrusions 35 and the housing 31. Hence, to lock the wiper blade 8 to the wiper arm 7, the user need not press the first and second buttons 61, 62 towards one another. The locking engagement may be provided by a snap fit provided by the cleats 51 and the protrusions 35.

When it is time to replace the wiper blade 8, the user presses both of the first button 61 and the second button 62 by reaching on opposite sides of the arm adaptor 30. By moving the first button 61 towards the second button 62 along the transverse direction T, the cleats 51 become disengaged from the protrusions 35 and the user may pull the wiper blade 8 away from the arm adaptor 30 along a second direction D2, which is parallel to the first direction D1 and perpendicular to the base 40. In the embodiment shown, the transverse direction T is substantially normal to the first and second directions D1, D2.

It will be appreciated that the locking member 50 and the user-engageable member 60 may be secured to the arm adaptor 30 instead of to the base 40. For instance, the arm adaptor 30 may include cleats that are movable to engage tabs or protrusions defined by the base 40. Moreover, the user-engageable member 60 may be a slider instead of a button; the user slides the slider in a direction substantially parallel to the arm adaptor 30 to disengage cleats from protrusions. In the embodiment shown, having the locking member 50 part of the base 40 instead of the arm adaptor 30 may ensure that the locking member 50, which may wear with time, is replaced every time the wiper blade is periodically replaced. This may prevent having to periodically replace the arm adaptor 30 because of wear of the locking member 50.

Referring now to FIGS. 9-10, another exemplary embodiment of a wiper connector is shown at 120. The connector 120 includes an arm adaptor 130, a base 140, a locking member 150, and a user-engageable member 160. The locking member 150 is located between the arm adaptor 130 and the base 140. The locking member 150 has a locked position in which the arm adaptor 130 is secured to the base 140 by the locking member 150. The locking member 150 has an unlocked position in which the arm adaptor 130 is detachable from the base 140 for replacement of the wiper blade 8. The user engageable member 160 is operatively connected to the locking member 150 and is movable in a direction to move the locking member 150 from the locked position to the unlocked position to detach the arm adaptor 130 from the base 140.

Figure 10A:
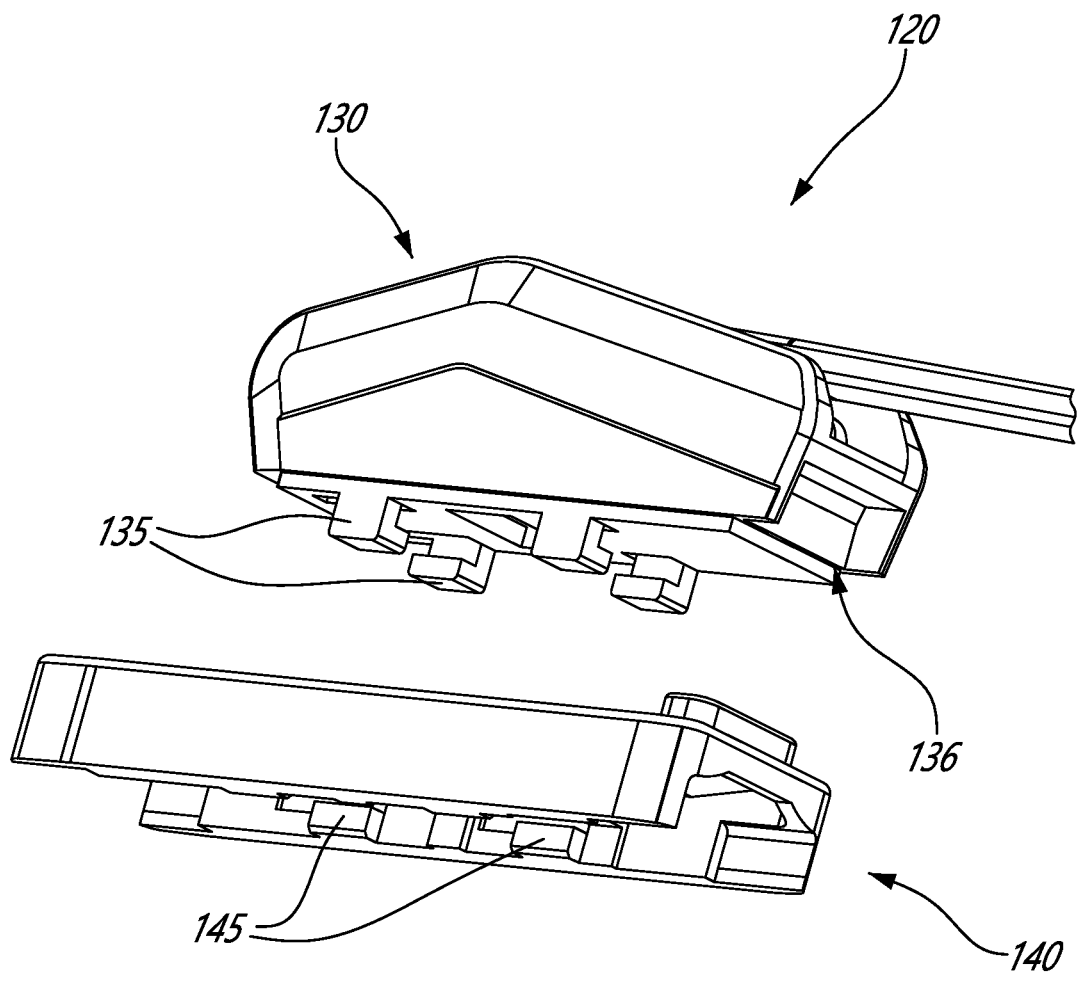
FIG. 10A is another three dimensional exploded view of the wiper blade connector of FIG. 10.

As shown in FIGS. 10-10A, and as for the arm adaptor 30 described above with reference to FIG. 3, the arm adaptor 130 includes a housing defining an inner cavity for receiving a j-hook connector 33. The arm adaptor 30 defines four L-shaped protrusions 135, two on each side of the arm adaptor 130. In an alternate embodiments, more or less than four L-shaped protrusions 135 may be used. Each of the L-shaped protrusions 135 is similar to the protrusions 35 described herein above and has a web and a tab at a distal end of the web; the tabs extending toward a center of the arm adaptor 130. They may alternatively extend away from the center. Each of the L-shaped protrusions 135 includes a web projecting from a bottom wall of the arm adaptor 130 and a tab protruding generally transversally from a distal end of the web. Alternatively, the tabs of the L-shaped protrusions 135 may extend away from one another. The arm adaptor 130 further defines an abutment portion 136 located at an end of the arm adaptor 30.

The base 140 includes a top wall 141 and side walls 142 cooperating to define a recess 143 for receiving the wiper blade 8. The top wall 141 defines four apertures 144, but more or less than four apertures 144 may be used. Each of the apertures 144 has a first portion 144a via which the L-shaped protrusions 135 may extend through the top wall 141 and a second portion 144b having a width less than that of the first portion 144a. Therefore, the L-shaped protrusions 135 may be received within the first portion 144a of the apertures 144 and, when the arm adaptor 130 is moved relative to the base 140 about a first longitudinal direction L1, which may be parallel to the base 140, distal portions of the L-shaped protrusions 135 become locked underneath the top wall 141 thereby limiting movement of the arm adaptor 130 relative to the base 140 about a direction being normal to the first longitudinal direction L1 and normal to the top wall 141. In other words, the second portions 144b of the apertures 144 have a width sized to accept the webs of the L-shaped protrusions 135 but less than a width of the tabs of the L-shaped protrusions 135 to lock the tabs underneath the top wall 141. As shown in FIG. 10A, the base 140 defines cleats 145 that are used to lock the base 140 to the wiper blade.

As illustrated in FIG. 10, the locking member 150 is provided as a shoulder 151 defined by an extension of the top wall 141. That is, the top wall 141 may have a cantilevered portion 141a that is flexible. In the present embodiment, the cantilevered portion 141a defines the shoulder 151. The user-engageable member is, in the present embodiment, a button 160 located at a distal end of the cantilevered portion 141a of the top wall 141. The shoulder 151 is in abutment against the abutment portion 136 of the arm adaptor 130 to limit relative motion of the arm adaptor 30 and the base 140 along the first longitudinal direction L1 when they are locked to one another.

Figure 11:
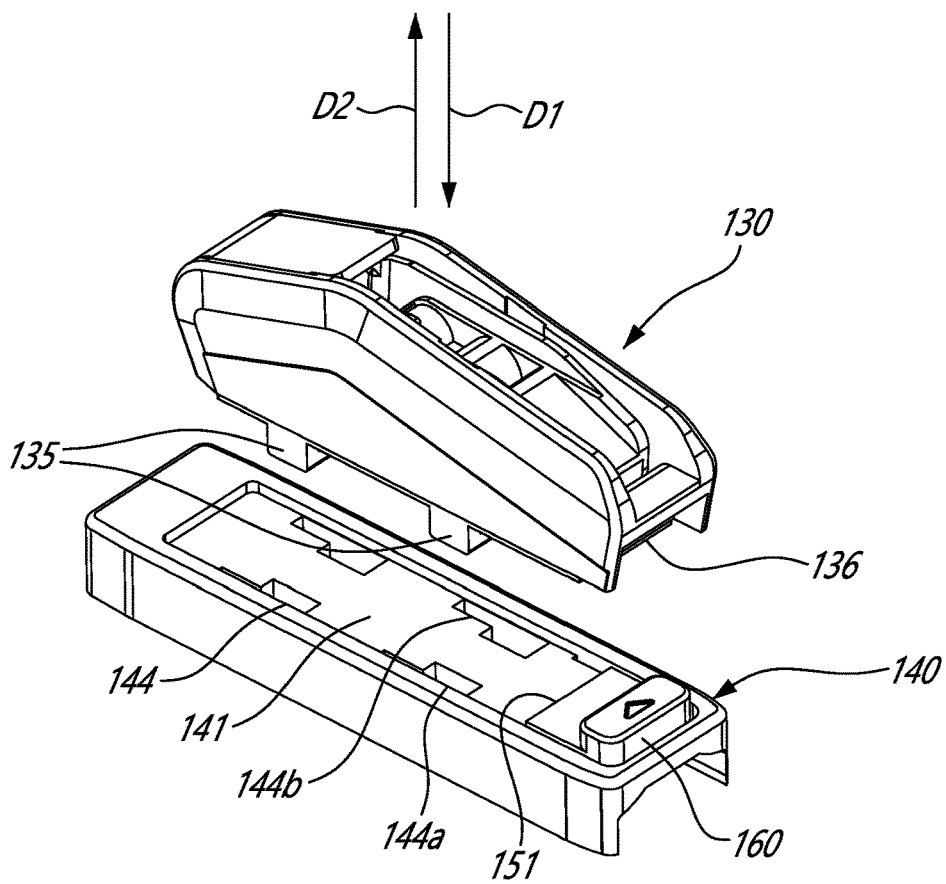
FIG. 11 is a three dimensional view of the wiper blade connector of FIG. 10 shown in a disengaged position.
Figure 12:
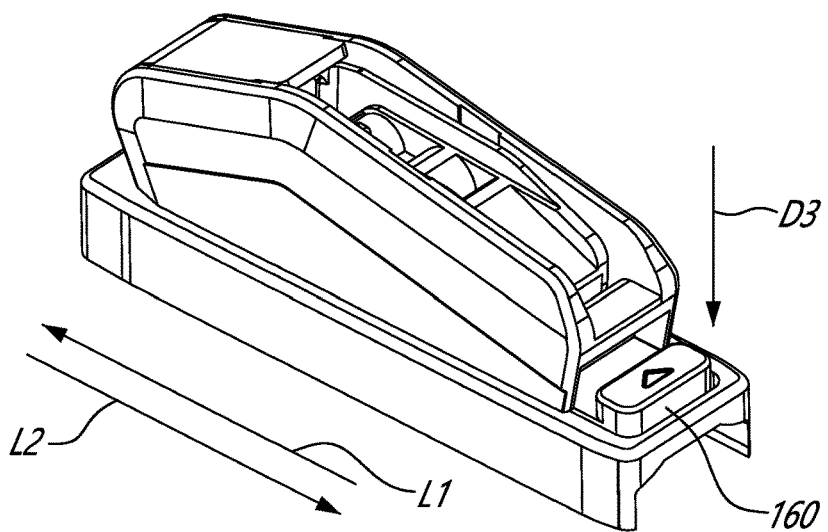
FIG. 12 is a three dimensional view of the wiper blade connector of FIG. 10 shown in an engaged position.

Referring now to FIGS. 11-12 with continued reference to FIG. 10, to connect the arm adaptor 130 to the base 140, the arm adaptor 130 is moved relative to the base 140 about the first direction D1 until the L-shaped protrusions 135 are received within the respective apertures 144 of the base 140. At which point, the base 140 is moved relative to the arm adaptor 130 about the first longitudinal direction L1 until the tabs of the L-shaped protrusions 135 become located underneath the top wall 141 of the base 140 and until the abutment portion 136 snaps into contact with the shoulder 151 thereby preventing movements of the base 140 relative to the arm adaptor 130 about a second longitudinal direction L2 opposite the first longitudinal direction L1.

When it is desired to replace the wiper blade 8, the user pushes the button 160 in a third direction D3, which may be substantially parallel to the first and second directions D1, D2. This downward motion of the button 160 disengages the abutment portion 136 from the shoulder 151 thereby allowing the base 140 to be moved relative to the arm adaptor 130 about the second longitudinal direction L2 until the tabs of the L-shaped protrusions 135 become in register with the first portions 144a of the apertures 144 thereby allowing a motion of the base 140 relative to the arm adaptor 130 about the second direction D2 to separate the base 140 from the arm adaptor 130.

Figure 14A:
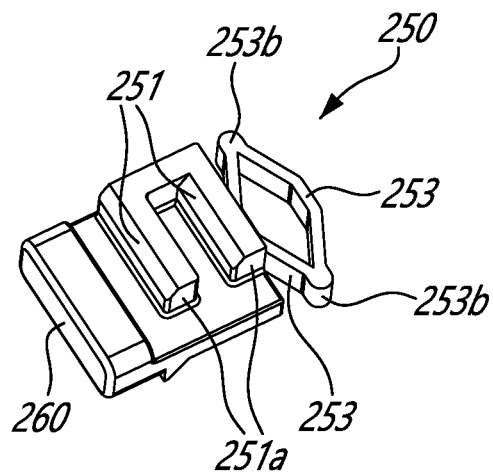
FIG. 14A is a top three dimensional view of a locking member of the wiper blade connector of FIG. 14.
Figure 14B:
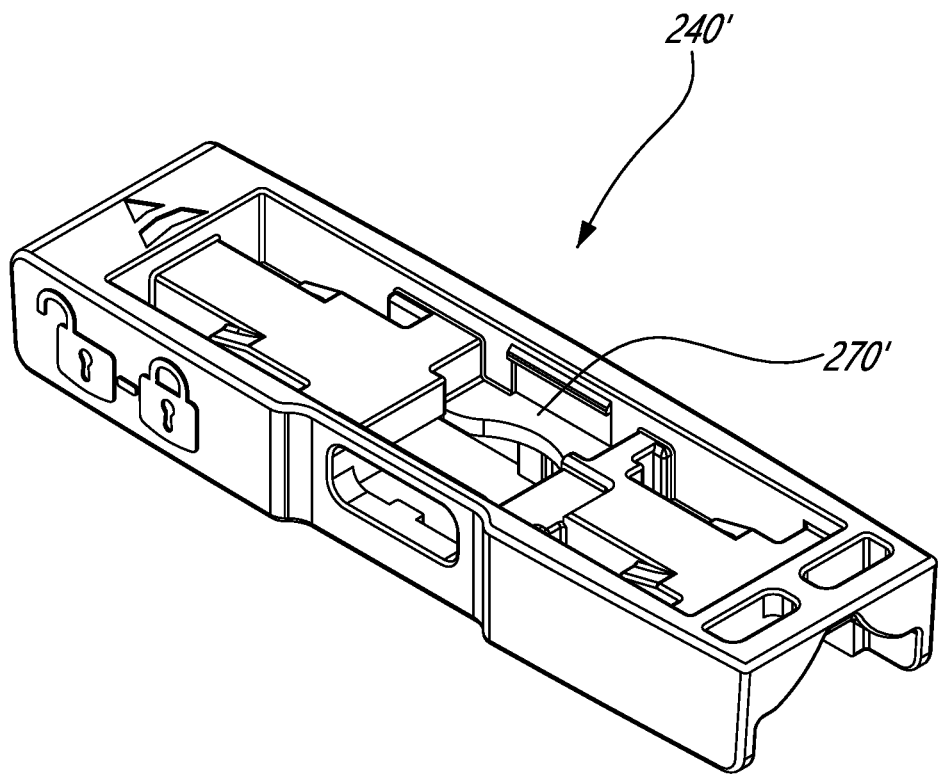
FIG. 14B is a three dimensional view of a base of the wiper blade connector of FIG. 14.

Referring now to FIGS. 13-14, another exemplary embodiment of a wiper connector is shown at 220. The connector 220 includes an arm adaptor 230, a base 240, a locking member 250, and a user-engageable member or button 260. The locking member 250 is located between the arm adaptor 230 and the base 250. The locking member 250 has a locked position in which the arm adaptor 230 is secured to the base 240 by the locking member 250. The locking member 250 has an unlocked position in which the arm adaptor 230 is detachable from the base 240 for replacement of the wiper blade 8. The button 260 is operatively connected to the locking member 250 and is movable in a direction to move the locking member 250 from the locked position to the unlocked position to detach the arm adaptor 230 from the base 240.

Figure 15:
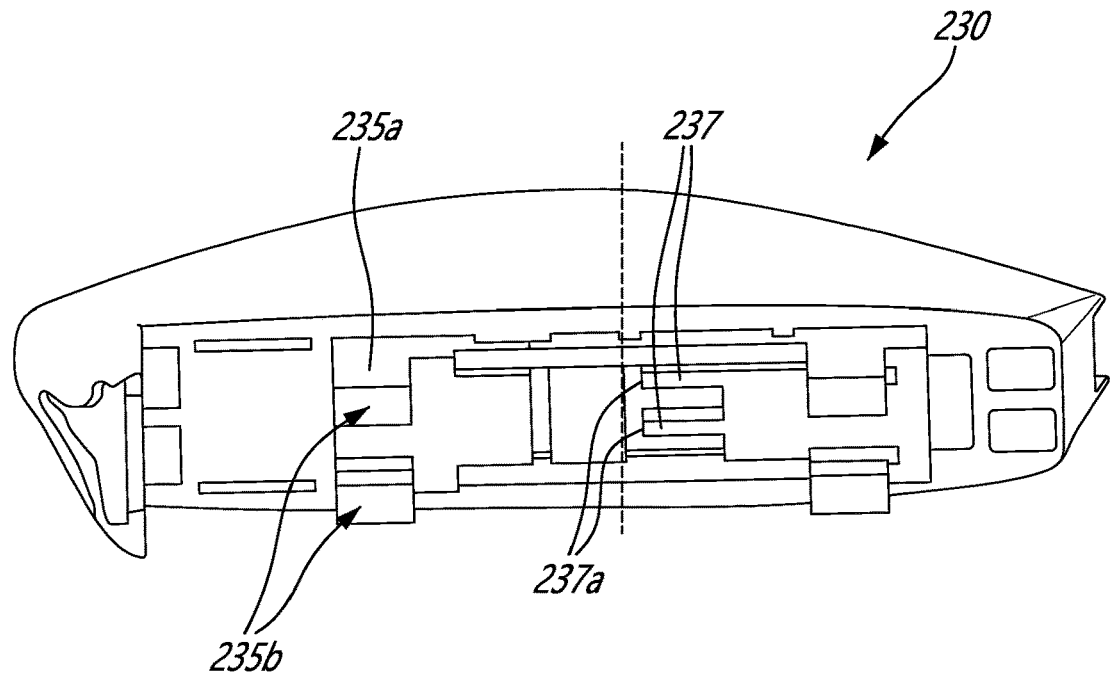
FIG. 15 is a three dimensional bottom view of an arm adaptor of the wiper blade connector of FIG. 14.

As shown in FIGS. 14-15, and as for the arm adaptor 30 described above with reference to FIG. 3, the arm adaptor 230 includes a housing defining an inner cavity for receiving a j-hook connector 33. Each of the L-shaped protrusions 235 has a web 235a and a tab 235b at a distal end of the web; the tabs 235b extending toward a center of the arm adaptor 230. Alternatively, the tabs 235a of the L-shaped protrusions 235 may extend away from one another. In the embodiment shown, the arm adaptor 230 defines one or more hook(s) 238 at its rear extremity to ensure a proper orientation of the arm adaptor 230 relative to the base 240.

In the embodiment shown, the base 240 includes a top wall 241 and side walls 242 cooperating to define a recess 243 for receiving the wiper blade 8. The top wall 241 defines four apertures 244, or recesses. Each of the apertures 244 has a first portion 244a via which the L-shaped protrusions 235 may extend through the top wall 241 and a second portion 244b having a width less than that of the first portion 244a. Therefore, the L-shaped protrusions 235 may be received within the first portion 244a of the apertures 244 and, when the arm adaptor 230 is moved relative to the base 240 about the first longitudinal direction L1, the tabs 235b of the L-shaped protrusions 235 become locked underneath the top wall 241 thereby limiting movement of the arm adaptor 230 relative to the base 240 about a direction being normal to the first longitudinal direction L1 and normal to the top wall 241. In other words, the second portions 244b of the apertures 244 have a width sized to accept the webs 235a of the L-shaped protrusions 235 but less than a width of the tabs 235b of the L-shaped protrusions 235 to lock the tabs 235b underneath the top wall 241.

Figure 16:
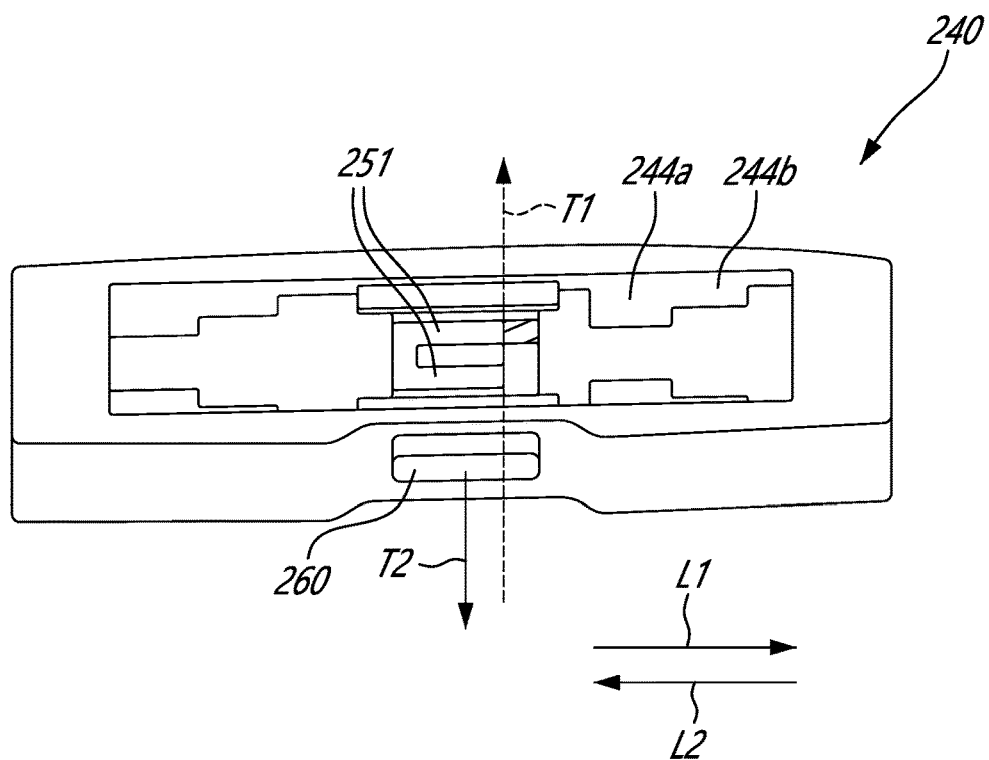
FIG. 16 is a top three dimensional view of a base of the wiper blade connector of FIG. 14.

Referring to FIGS. 14-16, the locking member 250 of the present embodiment is used to prevent the arm adaptor 230 from moving relative to the base 240 about the second longitudinal direction L2 to prevent the tabs 235b from being aligned with the first portions 244a of the apertures 244 defined by the base 240. More specifically, the arm adaptor 230 defines two stoppers 237. In the present embodiment, the two stoppers 237 are located between the four L-shaped protrusions 235.

The locking member 250 includes two projections 251, which, in the embodiment shown, are chamfered to ease coupling of the arm adaptor 230 to the base 240 as will be explained below. The locking member 250 includes a biasing member 253 at an opposite end of the button 260. The biasing member 253 includes two legs 253a connected together via two connections 253b. The two legs 253a act as a spring that is elastically deformable. The two connections 253b may be considered living hinges. To secure the locking member 250 to the base 240, the locking member 250 is inserted through an opening 240a extending through the base 240 until the button 260 becomes in register with, and extends into, an aperture 242a defined through one of the side walls 242 of the base 240. At which point, the biasing member 253 is biased against one of the side walls 242 that is opposite the side wall that defines the aperture 242a thereby maintaining the button 260 extending through the aperture 242a. A bottom cover 270 may be secured to the base 240 to lock the locking member 250 relative to the base 240. As shown in FIG. 14A, a base 240' in accordance with an alternate embodiment may include a shelf 270' to lock the locking member 250 relative to the base 240'. In this embodiment, the cover 270 may be omitted and replaced by the shelf 270' that is part of the base 240'.

Figure 17:
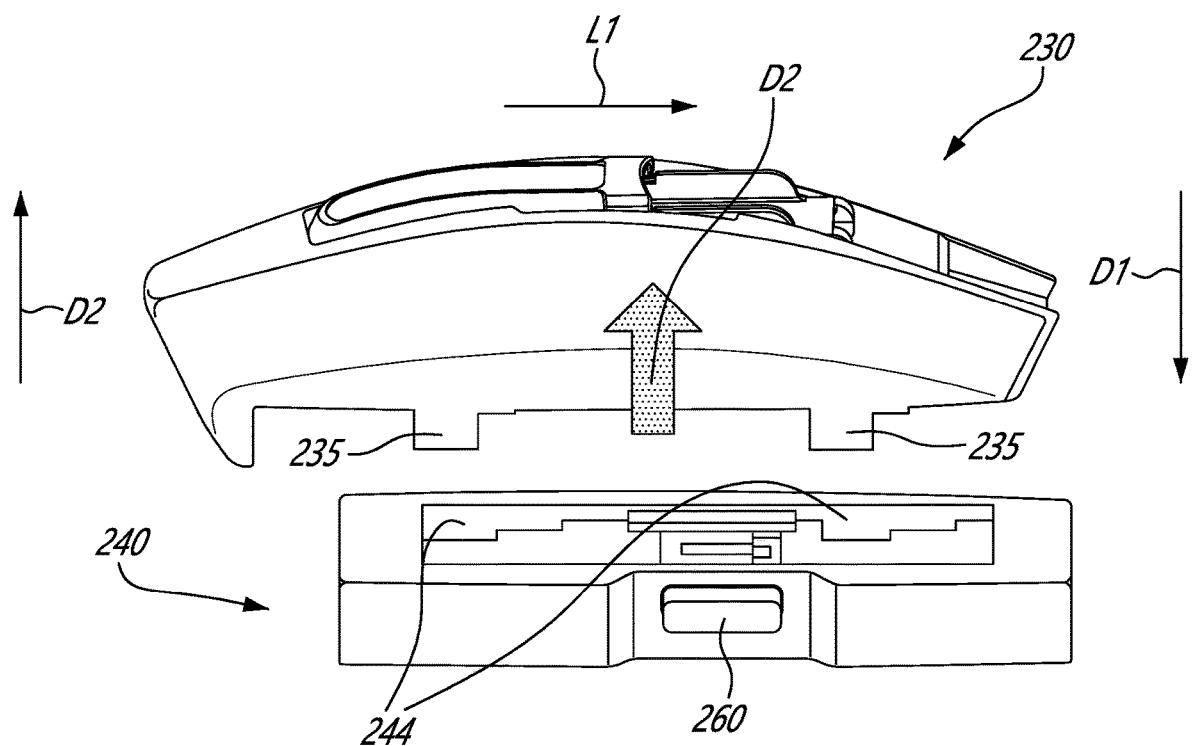
FIG. 17 is a three dimensional view of the wiper blade connector of FIG. 14 shown in a disengaged position.
Figure 18:
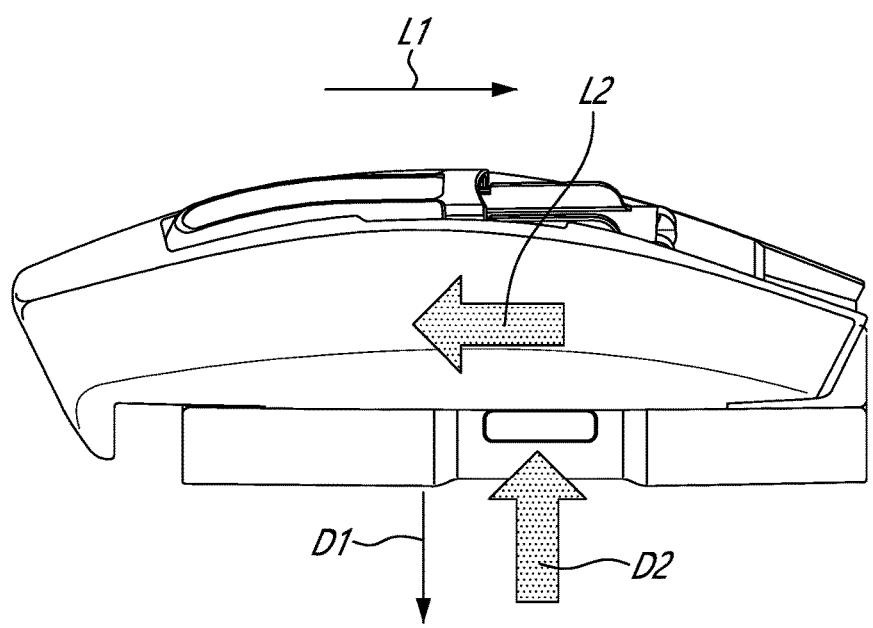
FIG. 18 is a three dimensional view of the wiper blade connector of FIG. 14 shown in an intermediate position.

Referring to FIGS. 17-18 with continued reference to FIGS. 14-16, for coupling the arm adaptor 230 to the base 240, the arm adaptor 230 is moved in relationship to the base 240 until the L-shaped protrusions 235 are in register with the first portions 244a of the apertures 244 defined through the top wall 241 of the base 240. As shown in FIG. 17, the arm adaptor 230 is moved relative to the base 240 about the first direction D1 to insert the tabs 235a of the L-shaped projections 235 into the apertures 244. This motion of the arm adaptor 230 relative to the base 240 creates an abutment between the stoppers 237 of the arm adaptor 230 and the projections 251 of the locking member 250 and pushes the projections 251, thanks to their chamfered faces, in a first transversal direction T1 (FIG. 16), which effectively pushes the button 260 inside the aperture 242a of the one of the side walls 242. The first transversal direction T1 is normal to the first direction D1 and normal to the first longitudinal direction L1. Once the tabs 235a are inserted into the first portions 244a of the apertures 244, the arm adaptor 230 is moved relative to the base 240 about the first longitudinal direction L1 until the webs 235a of the L-shaped protrusions 235 are received in the second portions 244b of the apertures 244 and until the tabs 235b are underneath the top wall 241 of the base 240. At which point, the abutment between the stoppers 237 and the projections 251 is cleared allowing the projections 251 and the button 260 to snap in a second transversal direction T2 opposite the first transversal direction T1. This results in ends 251a (FIG. 14) of the projections 251 becoming aligned with ends 237a (FIG. 15) of the stoppers 237. Therefore, movements of the arm adaptor 230 relative to the base 240 along the second longitudinal direction L2 are prevented by the projections 251 of the locking member 250 abutting against the stoppers 237 at their respective ends 251a, 237a.

To disengage the arm adaptor 230 from the base 240, the user pushes the button 260 along the first transversal direction T1 thereby offsetting the distal ends 237a of the stoppers 237 from the distal ends 251a of the projections 251 to allow movements of the arm adaptor 230 relative to the base 240 along the second longitudinal direction L2. This movement results in the tabs 235b of the L-shaped protrusions 235 of the arm adaptor 230 to become in register with the first portions 244a of the apertures 244 defined through the top wall 241 of the base 240. At which point, the user can move the arm adaptor 230 relative to the base 240 along the second direction D2 to completely separate the arm adaptor 230 from the base 240.

It will be appreciated that any of the devices 20, 120, 220 described herein above may be used with any kind of wiper arms 7 and are not limited to be used with j-hooks.

Figure 19A:
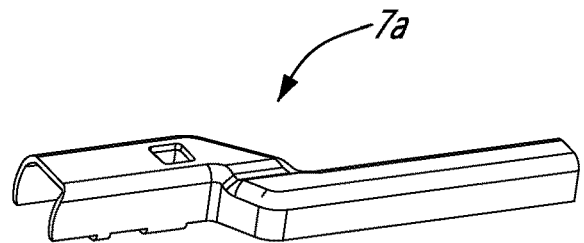
FIG. 19A is a three dimensional view of an exemplary arm of a wiper system.
Figure 19B:
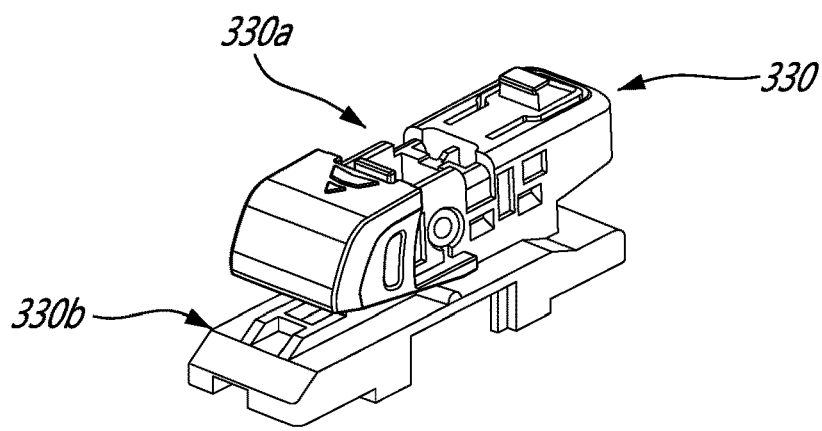
FIGS. 19B and 19C are three dimensional views of arm adaptors engageable by the arm of FIG. 19A.
Figure 19C:
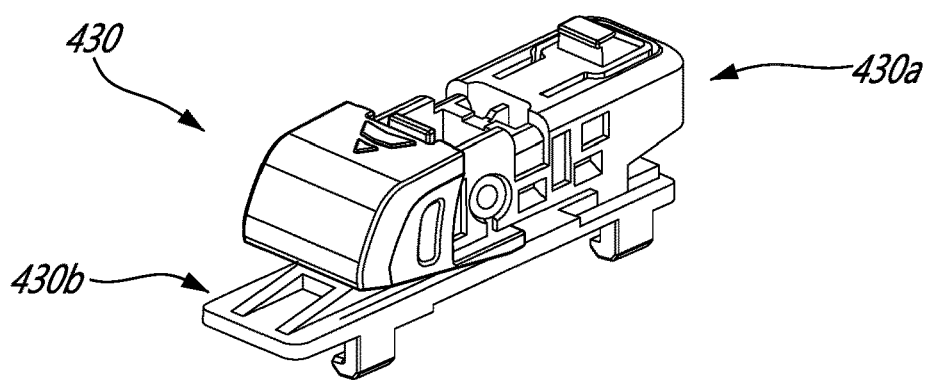

Referring now to FIGS. 19A, 19B, and 19C, an arm having a narrow top lock is shown at 7a on FIG. 19A. FIG. 19B shows an arm adaptor 330 having a body 330a configured to be matingly engaged by the arm 7a having the narrow top lock. The arm adaptor 330 has a base portion 330b that includes the protrusions 35 and other features described herein above with reference to FIGS. 3-6. FIG. 19C shows an arm adaptor 430 having a body 430a configured to be matingly engaged by the arm 7a having the narrow top lock. The arm adaptor 430 has a base portion 430b that includes the L-shaped protrusions 235 and other features described herein above with reference to FIGS. 14-15.

Figure 20A:
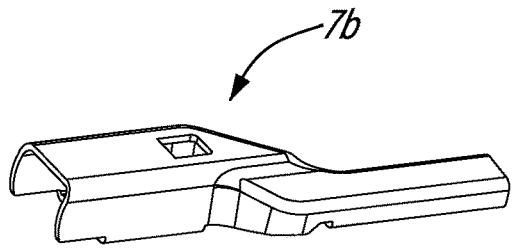
FIG. 20A is a three dimensional view of another exemplary arm of a wiper system.
Figure 20B:
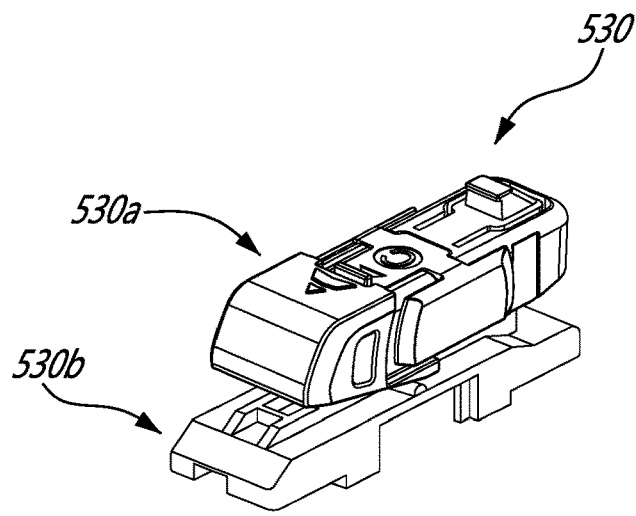
FIGS. 20B and 20C are three dimensional views of arm adaptors engageable by the arm of FIG. 20A.
Figure 20C:
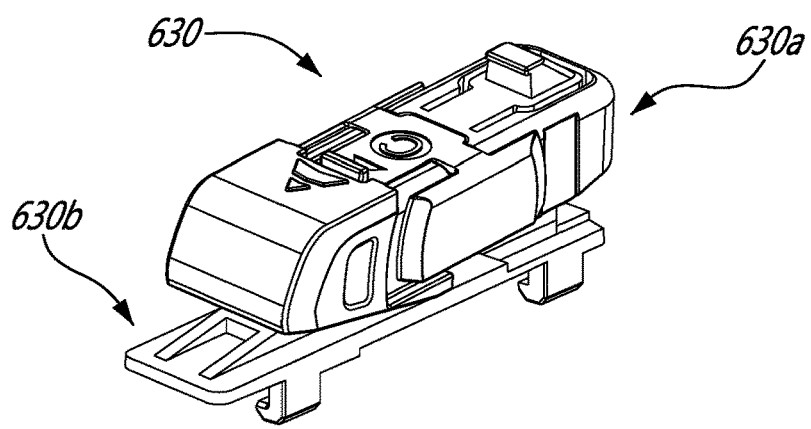

Referring now to FIGS. 20A, 20B, and 20C, an arm having a top lock is shown at 7b on FIG. 20A. FIG. 20B shows an arm adaptor 530 having a body 530a configured to be matingly engaged by the arm 7b having the top lock. The arm adaptor 530 has a base portion 530b that includes the protrusions 35 and other features described herein above with reference to FIGS. 3-6. FIG. 20C shows an arm adaptor 630 having a body 630a configured to be matingly engaged by the arm 7b having the top lock. The arm adaptor 630 has a base portion 630b that includes the L-shaped protrusions 235 and other features described herein above with reference to FIGS. 14-15.

Figure 21A:
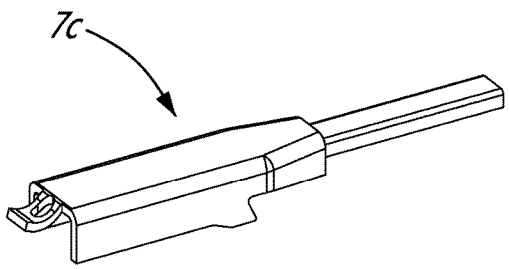
FIGS. 21A and 21B are three dimensional views of exemplary arms of a wiper system of a vehicle.
Figure 21B:
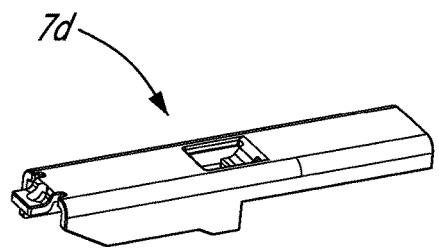
Figure 21C:
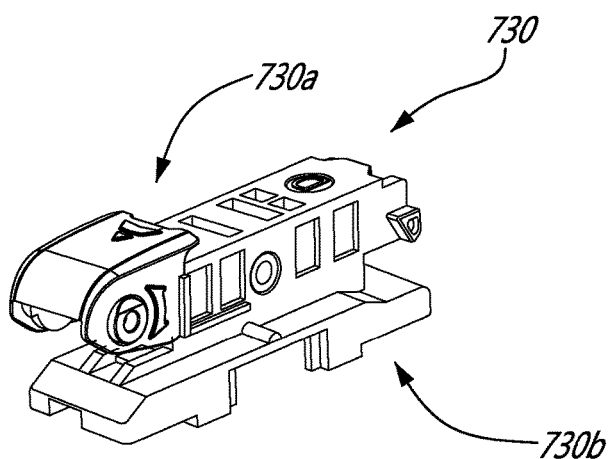
FIGS. 21C and 21D are three dimensional views of arm adaptors engageable by the arms of FIGS. 21A and 21B.
Figure 21D:
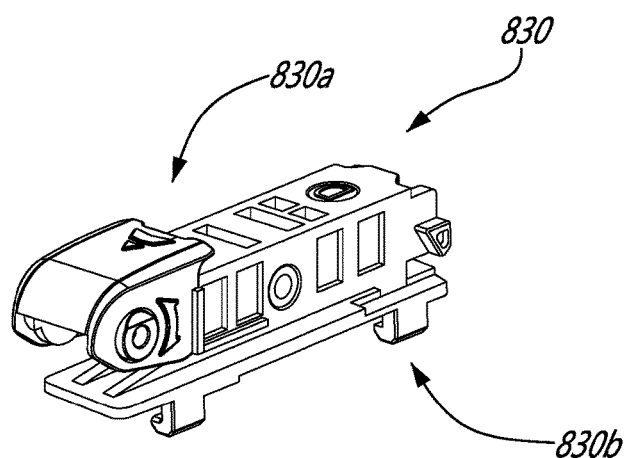

Referring now to FIGS. 21A, 21B, 21C, and 21D, an arm having a pinch tab is shown at 7c on FIG. 21A and an arm having another embodiment of a pinch tab is shown at 7d on FIG. 21B. FIG. 21C shows an arm adaptor 730 having a body 730a configured to be matingly engaged by either of the arms 7c, 7d of FIGS. 21A and 21B. The arm adaptor 730 has a base portion 730b that includes the protrusions 35 and other features described herein above with reference to FIGS. 3-6. FIG. 21D shows an arm adaptor 830 having a body 830a configured to be matingly engaged by either of the arms 7c, 7d of FIGS. 21A and 21B. The arm adaptor 830 has a base portion 830b that includes the L-shaped protrusions 235 and other features described herein above with reference to FIGS. 14-15.

Figure 22A:
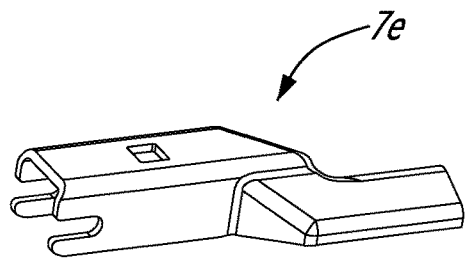
FIG. 22A is a three dimensional view of an exemplary arm of a wiper system of a vehicle.
Figure 22B:
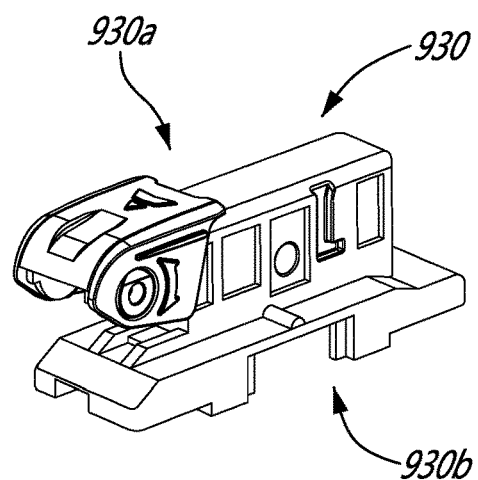
FIGS. 22B and 22C are three dimensional views of arm adaptors engageable by the arm of FIG. 22A.
Figure 22C:
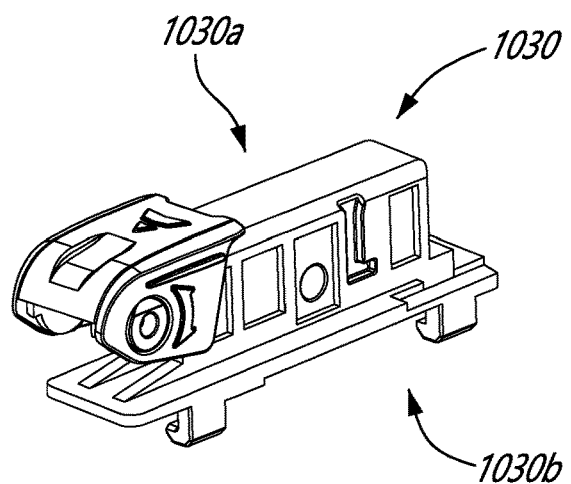

Referring now to FIGS. 22A, 22B, and 22C, an arm having a D-top lock is shown at 7e on FIG. 22A. FIG. 22B shows an arm adaptor 930 having a body 930a configured to be matingly engaged by the arm 7e having the D-top lock. The arm adaptor 930 has a base portion 930b that includes the protrusions 35 and other features described herein above with reference to FIGS. 3-6. FIG. 22C shows an arm adaptor 1030 having a body 1030a configured to be matingly engaged by the arm 7e having the D-top lock. The arm adaptor 1030 has a base portion 1030b that includes the L-shaped protrusions 235 and other features described herein above with reference to FIGS. 14-15.

Figure 23A:
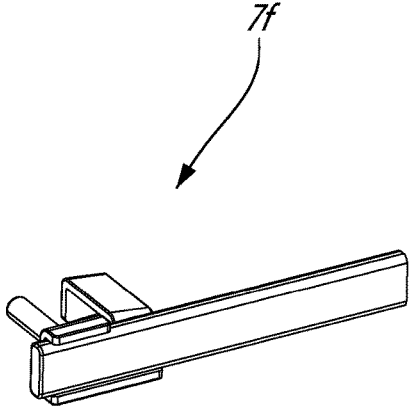
FIGS. 23A and 23B are three dimensional views of exemplary arms of a wiper system of a vehicle.
Figure 23B:
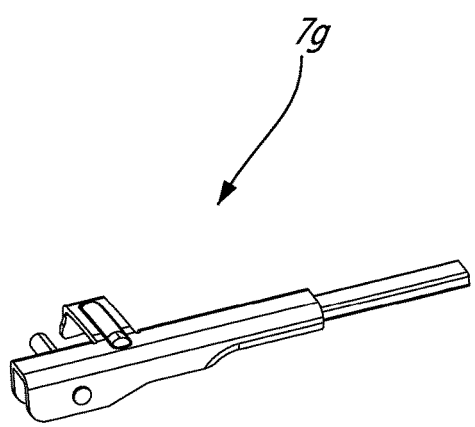
Figure 23C:
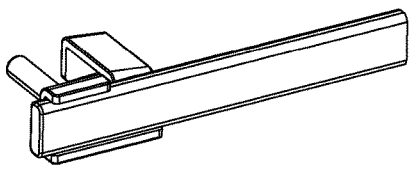
FIGS. 23C and 23D are three dimensional views of arm adaptors engageable by the arms of FIGS. 23A and 23B.
Figure 23D:
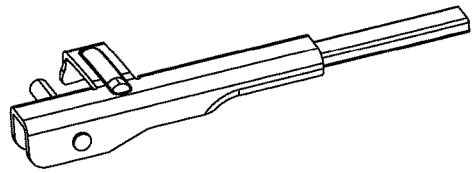

Referring now to FIGS. 23A, 23B, 23C, and 23D, an arm having a side pin is shown at 7f on FIG. 23A and an arm having a narrow side pin is shown at 7g on FIG. 23B. FIG. 23C shows an arm adaptor 1130 having a body 1130a configured to be matingly engaged by either of the arms 7f, 7g of FIGS. 23A and 23B. The arm adaptor 1130 has a base portion 1130b that includes the protrusions 35 and other features described herein above with reference to FIGS. 3-6. FIG. 23D shows an arm adaptor 1230 having a body 1230a configured to be matingly engaged by either of the arms 7f, 7g of FIGS. 23A and 23B. The arm adaptor 1230 has a base portion 1230b that includes the L-shaped protrusions 235 and other features described herein above with reference to FIGS. 14-15.

Figure 24A:
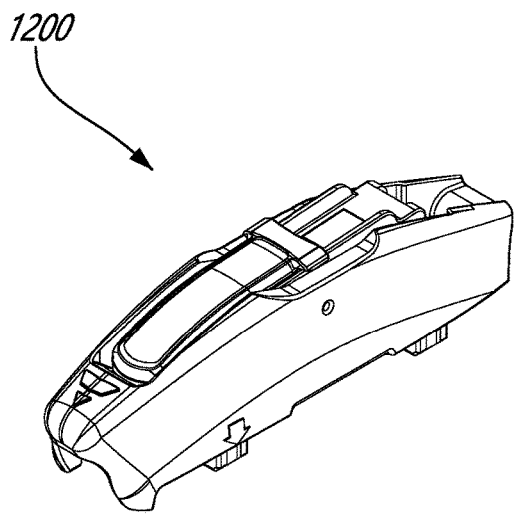
FIG. 24A is a three dimensional view of an arm adaptor in accordance with an alternate embodiment configured to be engaged by an arm shown in FIG. 24B.
Figure 24B:
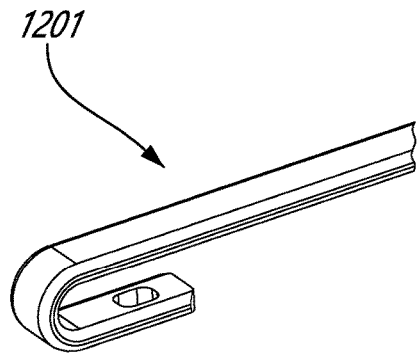
FIG. 24B is a three dimensional view of an arm embodied as a J-hook connector.
Figure 25A:
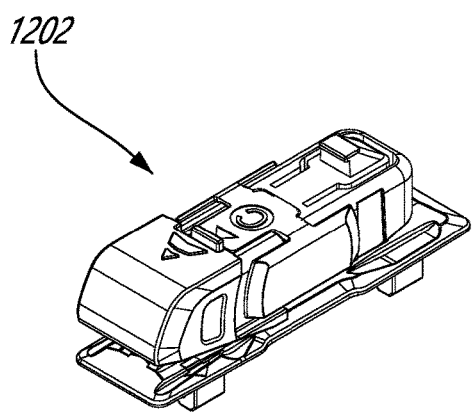
FIG. 25A is a three dimensional view of an arm adaptor in accordance with an alternate embodiment configured to be engaged by arms shown in FIG. 25B.
Figure 25B:
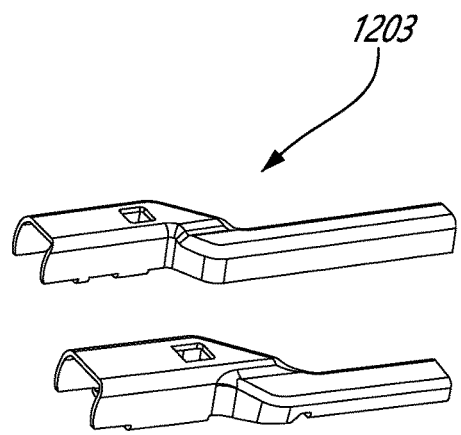
FIG. 25B are three dimensional views of arms embodied as top lock connectors.
Figure 26A:
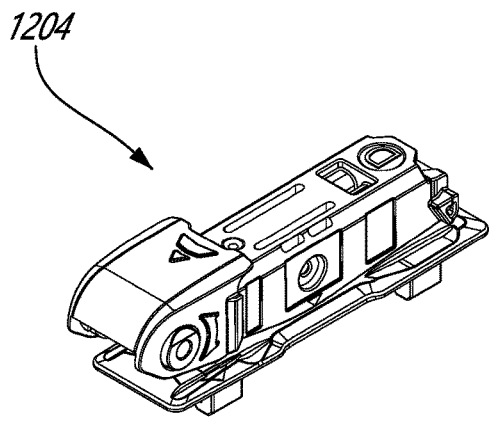
FIG. 26A is a three dimensional view of an arm adaptor in accordance with an alternate embodiment configured to be engaged by arms shown in FIG. 26B.
Figure 26B:
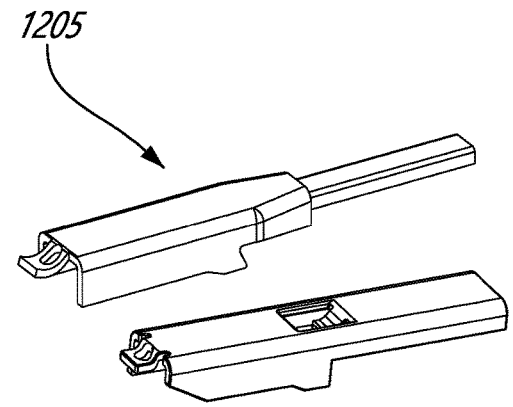
FIG. 26B are three dimensional views of arms embodied as pinch tab connectors.
Figure 27A:
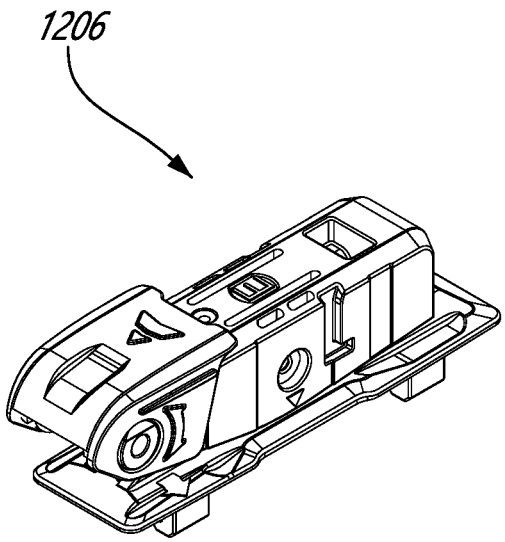
FIG. 27A is a three dimensional view of an arm adaptor in accordance with an alternate embodiment configured to be engaged by an arm shown in FIG. 27B.
Figure 27B:
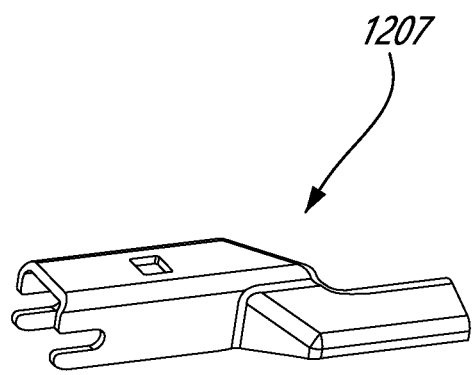
FIG. 27B is a three dimensional view of an arm embodied as a top lock connector.
Figure 28A:
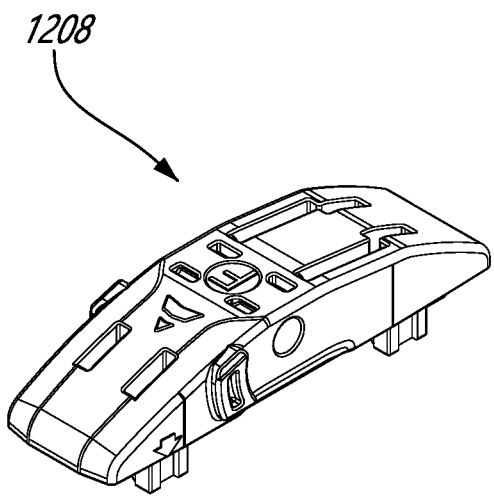
FIG. 28A is a three dimensional view of an arm adaptor in accordance with an alternate embodiment configured to be engaged by arms shown in FIG. 28B.
Figure 28B:
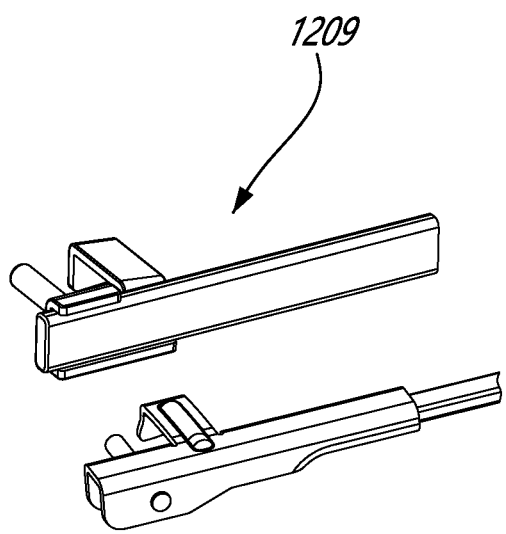
FIG. 28B are three dimensional views of arms embodied as side pin connectors.

Referring to FIGS. 24A and 24B, an exemplary housing 1200 for an arm adaptor is illustrated and is designed to be engageable by a J-hook connector 1201. Referring to FIGS. 25A and 25B, an exemplary housing 1202 for an arm adaptor is illustrated and is designed to be engageable by a top lock 'PTB' connector 1203. Referring to FIGS. 26A and 26B, an exemplary housing 1204 for an arm adaptor is illustrated and is designed to be engageable by a pinch tab 'I&L' connector 1205. Referring to FIGS. 27A and 27B, an exemplary housing 1206 for an arm adaptor is illustrated and is designed to be engageable by a top lock 'DE' connector 1207. Referring to FIGS. 28A and 28B, an exemplary housing 1208 for an arm adaptor is illustrated and is designed to be engageable by a side pin 'P&H' connector 1209.

It will be appreciated that although the user-engageable members 60, 160, 260 and the locking members 50, 150, 250 are, in the present embodiments, parts of a single monolithic body, this may not be the case. For instance, the locking members and the user-engageable members may be two separate pieces that may become in contact with one another when it is desired to disengage the arm adaptor from the base. Moreover, the locking members 50, 150, 250 have been described as being coupled to the base 40, 140, 240, but the locking members 50, 150, 250 may be instead coupled to the arm adaptors 30, 130, 230. In such a case, the L-shaped protrusions described above may alternatively be defined by the bases instead of by the arm adaptors.

The disclosed connectors 20, 120, 220 may ease replacement of the wiper blades of a vehicle. The user may remove worn out blades by simply engaging the user-engageable member (e.g., buttons) 60, 160, 260 to unlock the wiper blades from the wiper arms. The new blades may be sold with the base 40, 140, 240 attached thereto and compatible with the arm adaptor 30, 130, 230 such that simple attachment of the new wiper blade to the wiper arms may be quick and easy. As explained above, the attachment of new wiper blades is preformed simply by popping the new blades in until the locking member 50, 150, 250 engages the arm adaptors 30, 130, 230. The disclosed connectors 20, 120, 220 may remove guess work and waste of time in the store looking into catalogues in order to find the appropriate wiper blades.

In particular, when an initial purchase is triggered (i.e. when it is time to change the vehicle's wiper blade), the user may first proceed with a research phase to review different wiper blade offerings from various vendors. For this purpose, in order to assist his/her decision making, the user may search the Internet to review product images and descriptions and read online customer reviews. As understood by those skilled in the art, this may be performed using a device (e.g., a laptop computer, a personal computer, a tablet computer, a smartphone, or the like) configured to communicate over a network, such as the Internet. The user may then identify the wiper blade assembly that is compatible with his/her vehicle and proceed with a purchase (online using his/her device or in store). The initially purchased wiper blade assembly will comprise an arm adaptor 30, 130, 230 that is compatible with the vehicle's wiper arm, and a wiper blade with the base 40, 140, 240 attached thereto, the base being compatible with the arm adaptor 30, 130, 230. The user can then install the arm adaptor 30, 130, 230 to the vehicle's wiper arm and secure the base 40, 140, 240 to the arm adaptor 30, 130, 230 to install the new wiper blade. When comes time to change the wiper blade, the user only needs to subsequently purchase (online or in store) a new wiper blade (having a new base 40, 140, 240 attached thereto) that is compatible with the previously purchased arm adaptor 30, 130, 230 which remains on the vehicle's wiper arm. As previously noted, the arm adaptor 30, 130, 230 need not be removed from the wiper arm to change the wiper blade. The worn out wiper blade can be removed (by engaging the user-engageable member 60, 160, 260) and replaced with the new wiper blade by securing the base 40, 140, 240 of the newly purchased wiper blade to the previously purchased arm adaptor 30, 130, 230.

In some embodiments, the subsequent purchase may be a subscription purchase, in which a new wiper blade is automatically provided (e.g., delivered) to the user upon an existing wiper blade becoming worn out and needing replacement. In some embodiments, the user may opt to replace the wiper blades periodically, for instance, once a year, regardless of the wear of the wiper blades. For this purpose, the user may enroll with a subscription system and pay a recurring price (i.e. at regular intervals) to have access to a new wiper blade when replacement is needed. To enroll with the subscription system, users may each complete an application using their device and create a unique profile or account stored in a memory and/or database. Once registration is complete, each user may be provided with a unique identifier (such as an email address, username, and/or password associated with his/her profile) and access the subscription system upon the user identifying him/herself via the unique identifier. The need for replacement may be triggered manually by the user signaling (e.g., through their device, using any suitable communication means, such as email, text message, or the like) to the subscription system that his/her current wiper blade is worn out. Alternatively, the need for replacement may be triggered automatically by the subscription system at predetermined time intervals, each time interval corresponding to the expected lifetime of the wiper blade, or corresponding to a determined time period (e.g, one year). The cost of the new wiper blade may be automatically paid for by a pre-authorized charged to a credit card, a banking account, or the like, associated with the user's profile.

It will be appreciated that the disclosed wiper blade connectors may be used with any kind of vehicles, such as, All-Terrain Vehicles (ATVs), watercrafts, boats, snowmobiles, wheeled vehicles, and so on.

Any suitable modifications to the user-engageable member may be carried without departing from the scope of the present disclosure. For instance, the button may move in a direction transverse to the base instead of parallel to the base. In some other embodiments, the button may be a sliding mechanism to unlock the base from the adaptor.

As can be seen therefore, the examples described above and illustrated are intended to be exemplary only. The scope is indicated by the appended claims.

What is claimed is:

1. A wiper blade connector for connecting a wiper blade to a wiper arm, comprising:
    an adaptor secured to an end of the wiper arm;
    a base secured to the wiper blade;
    a locking member operatively mounted to one of the adaptor and the base and movable relative to the one of the adaptor and the base between a locked position and an unlocked position, the adaptor secured to the base via the locking member in the locked position, the adaptor detachable from the base in the unlocked position, the base having a base plate and a cover plate secured to the base plate, a space defined between the base plate and the cover plate, the locking member received within the space;
    a user-engageable member operatively connected to the locking member, the user-engageable member movable to move the locking member from the locked position to the unlocked position to detach the adaptor from the base.

2. The wiper blade connector of claim 1, wherein the locking member and the one of the adaptor and the base are separate components.

3. The wiper blade connector of claim 1, wherein the one of the adaptor and the base is the base.

4. The wiper blade connector of claim 1, wherein the locking member is movable within the space in a first direction being parallel to the base plate to unlock the adaptor from the base.

5. The wiper blade connector of claim 1, wherein the locking member includes an arm defining a cleat, the adaptor having a housing defining a protrusion, the cleat engaged to the protrusion in the locked position of the locking member, the cleat and the protrusion defining abutment faces that, when abutting one another, prevent movements of the base relative to the adaptor along a second direction being perpendicular to the base.

6. The wiper blade connector of claim 5, wherein the adaptor is engageable to the base along the second direction, the arm being biased in a first direction perpendicular to the second direction by a biasing member, the cleat defining a chamfered face, a movement of the adaptor relative to the base along the second direction causing abutment of the protrusion against the chamfered face of the cleat to move the cleat in the first direction until the cleat snaps in engagement with the protrusion thereby causing the abutment faces to abut one another.

7. The wiper blade connector of claim 5, wherein the arm includes two arms, the protrusion includes four protrusions, and the cleat includes four cleats, the four cleats located at opposed distal ends of the two arms.

8. The wiper blade connector of claim 7, comprising a biasing member between the two arms and engaged to the two arms and operable to exert a force to bias the two arms away from one another.

9. The wiper blade connector of claim 8, wherein the biasing member and the two arms are parts of a single monolithic body.

10. The wiper blade connector of claim 9, wherein the user-engageable member includes two buttons each defined by a respective one of the two arms.

11. The wiper blade connector of claim 10, wherein a movement of the adaptor relative to the base along the second direction causes abutment of the protrusions against chamfered faces of the cleats thereby moving the two buttons toward one another in a first direction perpendicular to the second direction until the cleats snap in engagement with the protrusions thereby causing the abutment faces of the protrusions and the cleats to abut one another.

12. A wiper blade connector for connecting a wiper blade to a wiper arm, comprising:
an adaptor secured to an end of the wiper arm;
a base secured to the wiper blade;
a locking member operatively mounted to one of the adaptor and the base and movable relative to the one of the adaptor and the base between a locked position and an unlocked position, the adaptor secured to the base via the locking member in the locked position, the adaptor detachable from the base in the unlocked position;
a user-engageable member operatively connected to the locking member, the user-engageable member movable to move the locking member from the locked position to the unlocked position to detach the adaptor from the base,
wherein the base includes a top wall defining at least one aperture having a first portion and a second portion of a lesser width than that of the first portion, the adaptor having a housing defining at least one L-shaped protrusion protruding transversally from a bottom wall of the housing, the at least one L-shaped protrusion having a web and a tab extending transversally to the web, the tab receivable within the first portion of the at least one aperture,
wherein the adaptor is movable relative to the base in a first direction being perpendicular to the top wall until the tab is received through the first portion of the at least one aperture, and movable in a second direction transverse to the first direction until the web is received within the second portion of the at least one aperture and until the tab is underneath the top wall thereby preventing movements of adaptor relative to the base in the first direction, and
wherein the locking member is received within a cavity of the base, the locking member having at least one projection in abutment against a stopper of the housing of the adaptor to prevent movement of the adaptor relative to the housing in the second direction.

13. The wiper blade connector of claim 12, wherein the locking member is biased in the locked position by a biasing member engaged to the base.

14. The wiper blade connector of claim 13, wherein the locking member and the biasing member are parts of a single monolithic body.

15. The wiper blade connector of claim 14, wherein the user-engageable member is a button defined by the locking member, the button protruding through an opening defined through a side wall of the base, the button movable in a third direction perpendicular to both of the first direction and the second direction.

* * * * *